United States Patent
Söker

[19]

[11] Patent Number: 5,946,451
[45] Date of Patent: Aug. 31, 1999

[54] METHOD FOR GENERATING A CONTONE MAP

[75] Inventor: Wilfried Helmut Söker, Altenstadt, Germany

[73] Assignee: Linotype-Hell AG, Eschborn, Germany

[21] Appl. No.: 08/737,892

[22] PCT Filed: Apr. 3, 1996

[86] PCT No.: PCT/DE96/00585

§ 371 Date: Feb. 19, 1997

§ 102(e) Date: Feb. 19, 1997

[87] PCT Pub. No.: WO96/31837

PCT Pub. Date: Oct. 10, 1996

[30] Foreign Application Priority Data

Apr. 7, 1995 [DE] Germany .......................... 195 13 105

[51] Int. Cl.⁶ .............................. B41B 15/00; H04N 1/41
[52] U.S. Cl. .......................... 395/109; 395/109; 395/114; 395/116; 358/426; 358/428; 358/429
[58] Field of Search ..................... 358/426, 428, 358/429; 395/114, 116, 109

[56] References Cited

U.S. PATENT DOCUMENTS

| | | | |
|---|---|---|---|
| 5,125,072 | 6/1992 | Ng | 395/112 |
| 5,129,049 | 7/1992 | Cuzzo et al. | 395/112 |
| 5,542,031 | 7/1996 | Douglass et al. | 395/114 |
| 5,552,898 | 9/1996 | Deschytere | 358/426 |
| 5,602,976 | 2/1997 | Cooper et al. | 395/116 |

FOREIGN PATENT DOCUMENTS

| | | |
|---|---|---|
| 0 470 782 A2 | 2/1992 | European Pat. Off. . |
| 0 571 145 A1 | 11/1993 | European Pat. Off. . |
| 0 574 224 A2 | 12/1993 | European Pat. Off. . |
| 0 613 102 A1 | 8/1994 | European Pat. Off. . |

*Primary Examiner*—Edward L. Coles
*Assistant Examiner*—Twyler Lamb
*Attorney, Agent, or Firm*—Hill & Simpson

[57] ABSTRACT

A method is provided for generating a data format for describing a reproducible printer page for electronic recording. A programmed page description of a content of the printed page composed of text, graphics and image information is processed by an interpreter, and a list of graphic objects is generated. The objects are superimposed in a memory according to their position on the printed page. The objects are subdivided into simpler objects free of superimposition. Picture elements are generated for the simpler, superimposition-free objects. The picture elements are presented by grey scale values. The picture elements are combined to form a description of the printed page organized pixel-by-pixel and line-by-line as a contone map.

19 Claims, 20 Drawing Sheets

GENERATE DELTA LIST

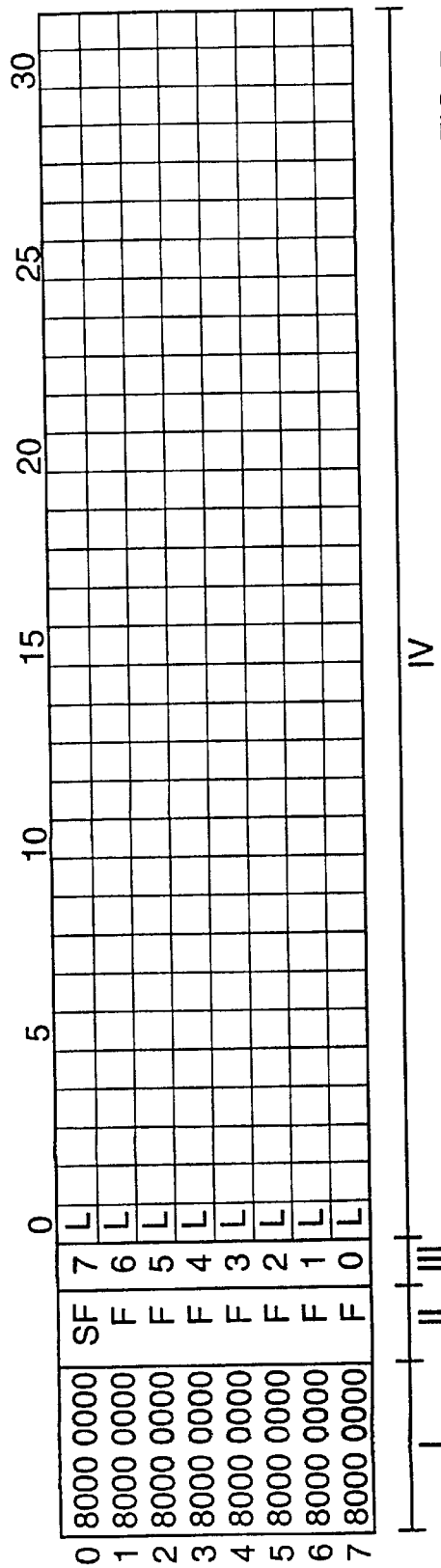
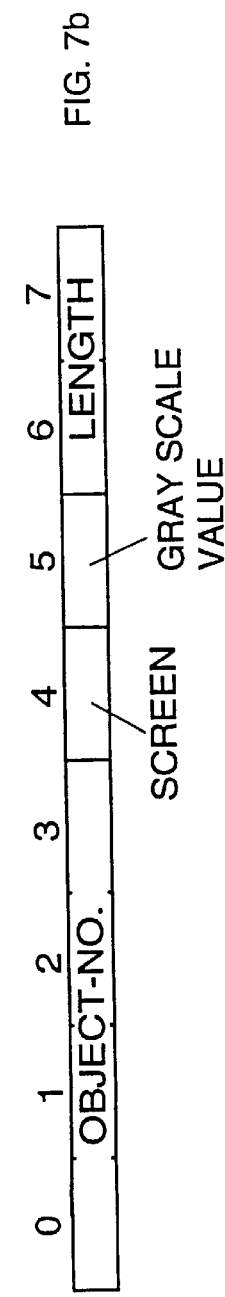
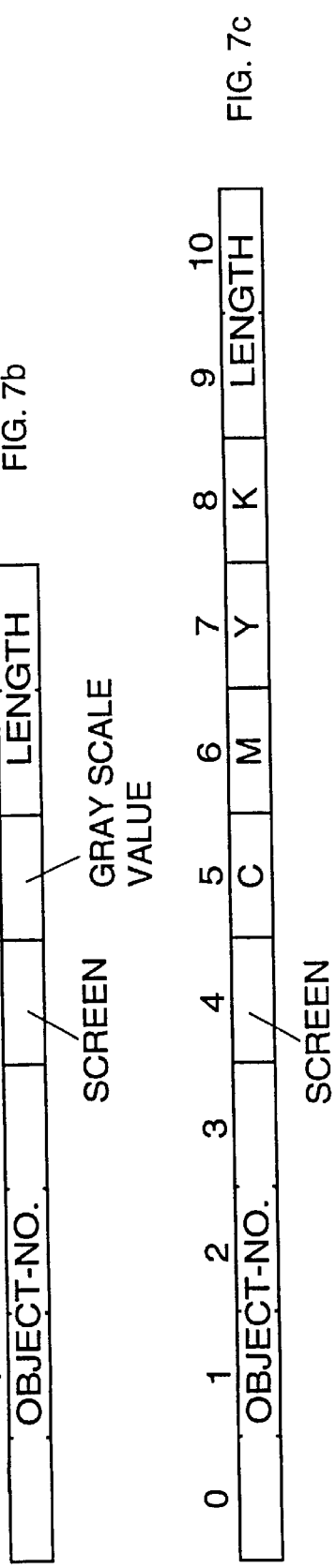

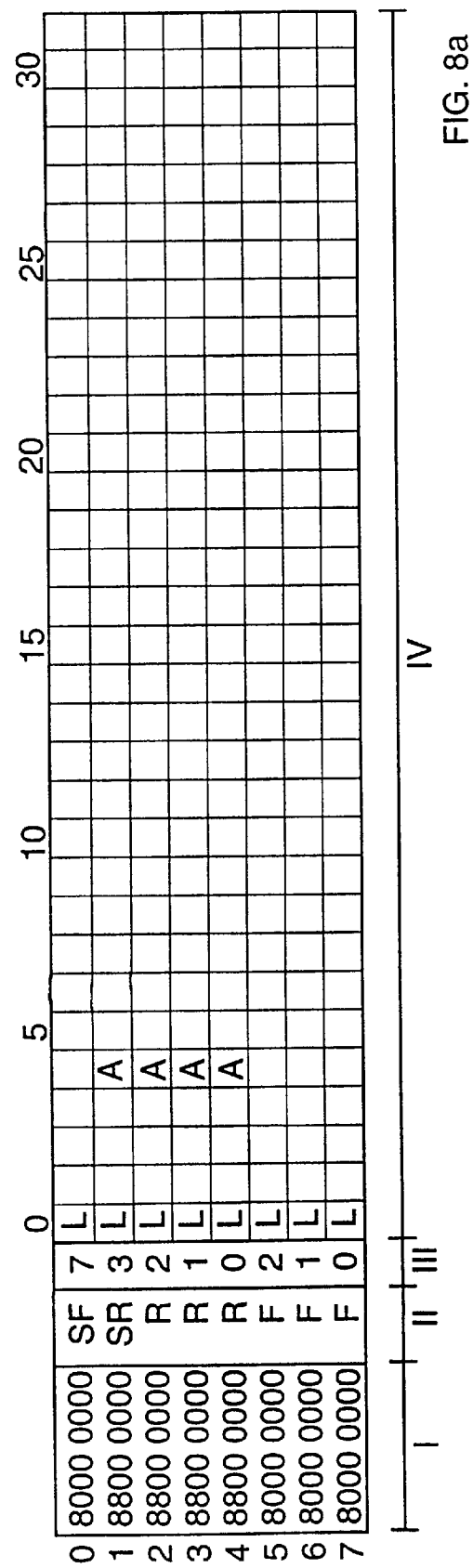

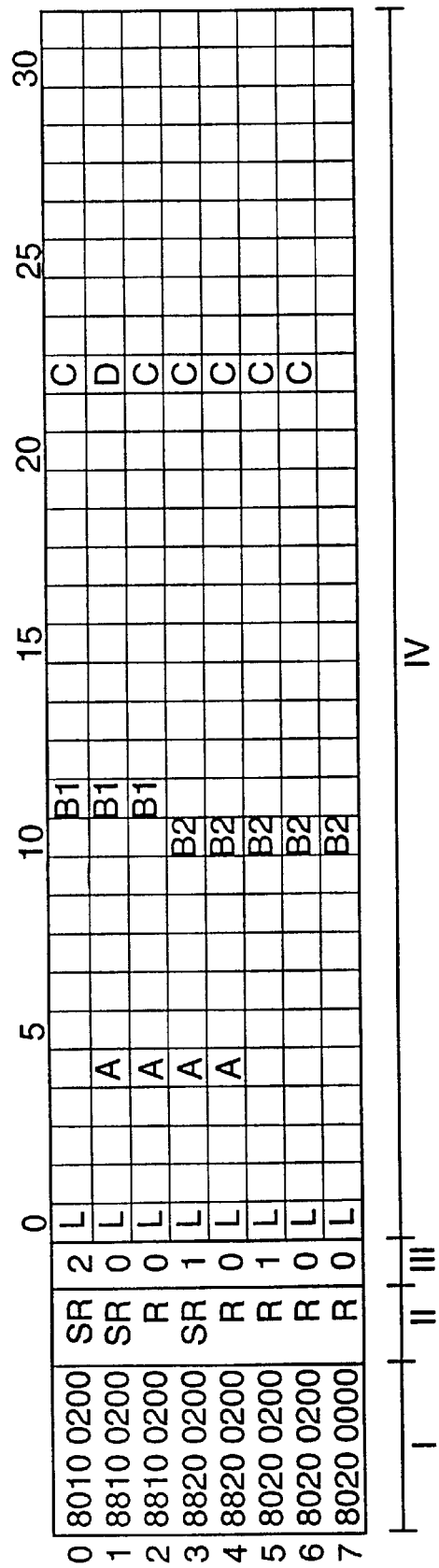

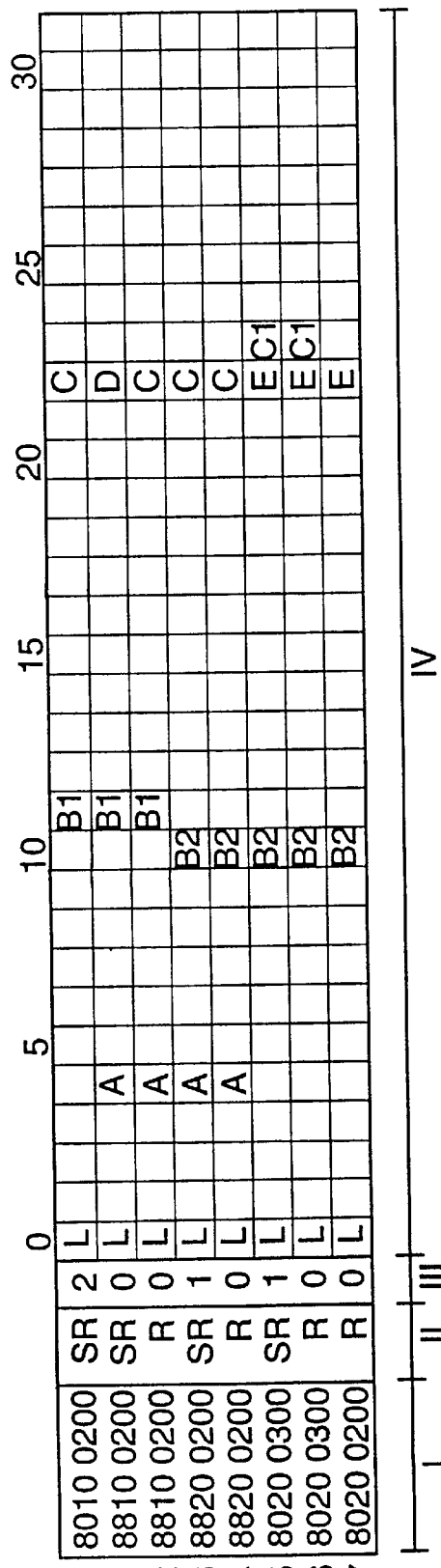

METHOD FOR GENERATING A CONTONE MAP

BACKGROUND OF THE INVENTION

The invention is in the field of electronic reproduction technology and is directed to a method for generating a contone map for electronic exposers or recorders with high resolution for pixel-by-pixel and line-by-line exposure of recording material.

In reproduction technology, printer's copies are produced for printed pages that contain all elements such as texts, graphics and images to be printed. FIG. 1 shows an example of a printed page. A separate printer's copy that contains all elements that are printed in the respective color is produced for each ink in chromatic printing. These are the inks cyan, magenta, yellow and black (C,M,Y,K) for four-color printing. The printer's copies separated according to inks are also called color separations. The printer's copies are usually screened and exposed in high resolution on films that are then further-processed for producing the printing forms (printing plates, printing cylinders). Alternatively, the printer's copies can also be directly exposed onto printing plates in special recorders. For reviewing the content and the colors of the printed pages, printer's copies are exposed in proof recorders with a recording process that simulates the printing process in a chromatic output. Instead of individual printed pages, printer's copies can also contain signatures that are composed of an arrangement of a plurality of printed pages.

FIG. 2 shows the work sequence in the exposure of printer's copies for printed pages produced in the page description language PostScript that has been mainly employed in the prior art up to now. The PostScript data 1 are supplied to a raster image processor (=RIP) (2), which can be a computer specifically optimized for this job or a program on a standard computer. PostScript data 1 for every color separation are normally generated in a pre-process for every color separation of a printed page and are forwarded to the RIP (2) (separated PostScript). Alternatively, a chromatic printed page can also be generated in a single PostScript dataset (composite PostScript). The case of separated PostScript data 1 shall be explained in greater detail below.

In a first step, the PostScript data 1 are analyzed in an interpreter 3 and resolved into a sequence of simple graphic objects. For that purpose, the printer's copy is divided into horizontal strips (bands) that are successively processed. FIG. 3 shows a band excerpt 9 with a few objects generated by the interpreter. The band excerpt 9 is divided into recording pixels 10. In the example of FIG. 3, the band excerpt is 8 pixels high, numbered from 0 to 7, and 32 pixels wide, numbered from 0 to 31. The resolution can be symmetrical (the same in horizontal and vertical direction) or asymmetrical, for example twice as great horizontally as vertically. The objects A through E (11,12,13,14,15) describe sub-segments of text, graphics or image elements that fall within the band excerpt 9.

The interpreter outputs the objects A through E (11,12,13,14,15) in a data format that is referred to as display list 4 (FIG. 2). For each object, the data format describes its geometrical shape and the gray scale value with which it is filled. The objects A through E (11,12,13,14,15) appear successively in the display list 4 in the sequence in which the corresponding page elements are described in the PostScript data. Objects that appear later in the display list 4 can thereby partly or entirely cover objects that appeared earlier in the display list 4. In the example of FIG. 3, the object A (11) is partly covered by the object B (12). Likewise, the objects D (14) and E (15) cover the object (C).

In a further step in the RIP 2, the display list 4 is supplied to a raster generator 5 that successively converts the objects of the display list 4 into AREAS filled with raster points and enters them into a bit map memory 7 as bit map data 6. The raster point size is thereby varied dependent on the gray scale value of the object in the display list 4. The bit map data 6 of objects that appear later in the display list 4 respectively overwrite the corresponding of areas of the bit map memory 7. After all objects of a band have been rastered by the raster generator 5 and written into the bit map memory (7), the content of the bit map memory (7) is forwarded as control signal values to the recorder (8) and exposed thereat.

Due to the overlap of the objects in the display list 4 and the repeated screening of sub-areas in the bit map memory 7 that overlap, the time that the RIP 2 requires in the previous procedure for the processing and output of a band to the recorder 8 is variable and not predictable. It is dependent on how many objects occur in a band and the proportion to which they overlap. Given the high speed of modern recorders, the data rate upon utilization of an asymmetrical resolution can, for example, amount to up to 200 million pixels per second. If it is not assured that the RIP 2 can continuously supply the control signal values for the recorder 8 with the data rate prescribed by the recorder speed, then the recorder 8 must operate in what is referred to as a start/stop mode. In the start/stop mode of a recorder, the exposure is interrupted given the lack of the control signal values until the RIP 2 again supplies control signal values, and the exposure is then seamlessly continued at the location of the interruption.

The mechanical and optical design of a recorder that can expose films or printing plates in start/stop mode with high resolution without having the start/stop locations visible in the finished recording is more complicated and costly than for a recorder that exposes continuously. The stopping and reactivation of the recorder, moreover, requires additional time for each start/stop event, so that the exposing can thereby last considerably longer than given a continuous operation of the recorder.

On the other hand, a RIP that, regardless of the complexity of the page contents, can respectively convert the PostScript data for printed pages into bit map data so fast that it can always keep step with the exposure speed of a continuously operating exposer requires extremely fast processors and large memories and thereby likewise becomes expensive.

The solution of making the bit map memory 7 in the RIP so large that it can intermediately store the bit map data of an entire printer's copy (page buffer) is not practical since the memory then becomes extremely large and costly. For a printing plate having the size 70 cm×100 cm and a resolution of 2666 pixels/cm (6772 dpi; dpi=dots per inch) horizontally and 1333 lines/cm (3383 dpi) vertically, a buffer size of 3109.6 Mbyte derives. A hard disk is eliminated as a page buffer since it cannot read the bit map data out with the required speed of 100 to 200 Mbit/s.

As a result of the fact that some commercially available recorders offer no possibility or only an inadequate possibility of a start/stop mode, there is a necessity of achieving an adequately high speed in the data conversion in the RIP with reasonable processor and memory costs.

As a consequence of the high memory requirement for the finished bit map of a printer's copy, the bit map of a printer's copy can usually not be intermediately stored given the previous procedure for the exposure of PostScript data. When the same printer's copy is to be exposed again, for example because the film or the printing plate exposed first was damaged, the entire processing procedure from the interpretation of the PostScript data up to the exposure must be repeated. This costs additional time and occupies the RIP that could already process a new printer's copy during this time.

For the same reason, the additional exposure of the printer's copy on a proof output unit—given the previous procedure—requires another entire run of the PostScript data through the RIP and therefore wastes unnecessary time. Added thereto as a further disadvantage is that the proof device generally has a different resolution than the film exposer for color separations, so that the RIP must work with different resolution for the two output units. This leads to minute differences between the proof output and the film output, for example in regions where objects exactly adjoin one another. The proof output therefore does not always provide all of the details of the later print. This runs contrary to the purpose of a proof output and is therefore disadvantageous.

SUMMARY OF THE INVENTION

It is therefore an object of the present invention to avoid the aforementioned disadvantages and to specify a method with which a compressed and overlay-free contone map (delta list) is generated with little memory outlay and compression and wherein decompression and exposing can be carried out at high speed. This enables the cost-beneficial intermediate storage of the entire printer's copy and the exposing of films and proof outputs from the stored contone map without having to reinterpret the PostScript data each time. The compressing and the freedom of overlap of the contone map enables the conversion of the contone map into screened bit map data with high speed and enables the exposing without the start/stop mode of the recorder.

This object is achieved by employing a new data format that is also referred to as a delta list. The new data format can be advantageously used in output devices having high resolution for the various output processes such as rotogravure, offset printing, proofing, monitor, etc., without modification of the interpreter in the RIP. The memory requirement of the delta list is considerably lower than for a page buffer, for example about 2 Mbytes to 30 Mbytes per A4 page, dependent on the nature of the job.

According to the method of the invention, a data format is generated for describing a reproducible printer page for electronic recording. A programmed page description of a content of the printed page composed of text, graphics and image information is processed by an interpreter, and a list of graphic objects is generated. The objects are superimposed in a memory according to their position on the printed page. The objects are subdivided into simpler objects free of superimposition. Picture elements are generated for the simpler, superimposition-free objects. The picture elements are presented by grey scale values. The picture elements are combined to form a description of the printed page organized pixel-by-pixel and line-by-line as a contone map.

The invention is described in greater detail below with reference to FIGS. 1 through 24.

BRIEF DESCRIPTION OF THE DRAWINGS

FIG. 7 illustrates the structure of the intermediate buffer;

FIG. 8 shows the intermediate buffer after entry of the object A;

FIG. 11 shows the intermediate buffer after entry of the object D;

FIG. 12 shows the intermediate buffer after entry of the object E;

DESCRIPTION OF THE PREFERRED EMBODIMENTS

Generalities

Figure 1:
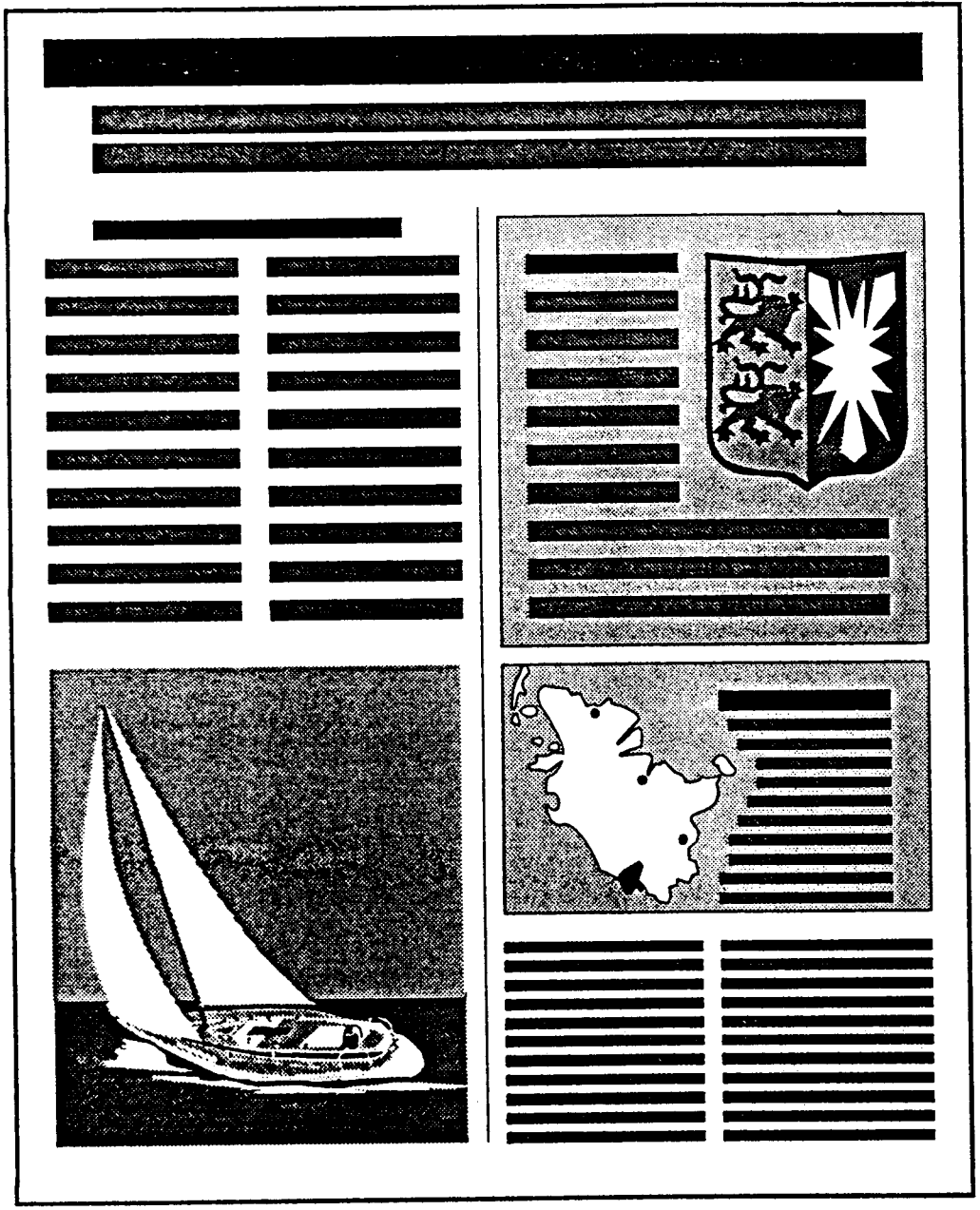
FIG. 1 is an example of a printed page with text, graphics and image elements.
Figure 2:
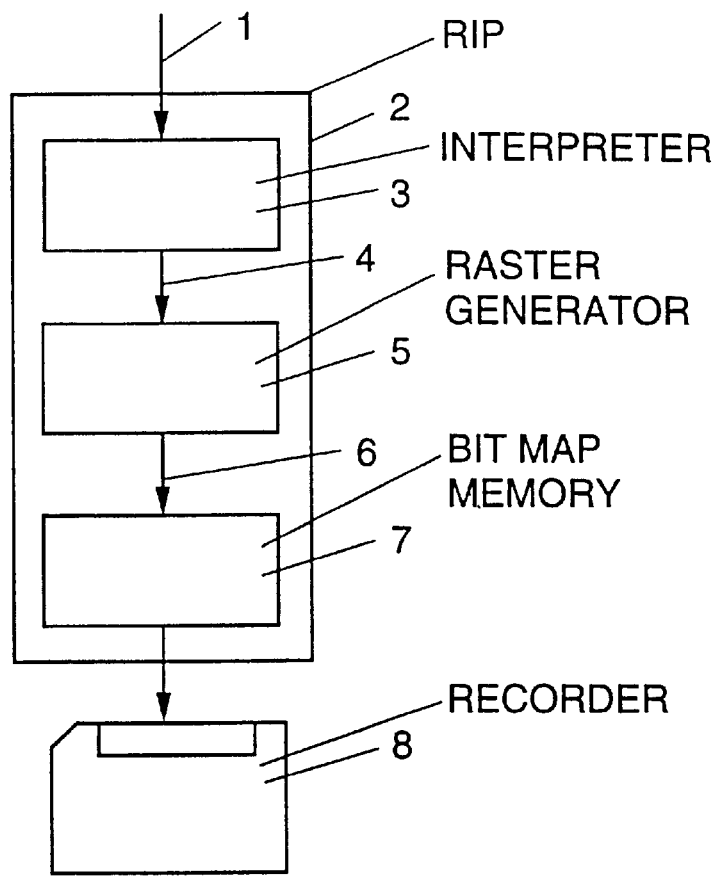
FIG. 2 shows the work sequence in the exposure of PostScript data according to the Prior Art.

Throughout this specification the words "raster" and "screen" are used interchangeably, as is known in this art.

A contone map describes a reproducible printer's copy in the form of gray scale values in which a gray scale value is allocated to each pixel. The contone map is generated from the page description data (PostScript data) of the printed page to be reproduced. The gray scale values of the contone map can be directly employed for the control of the recorder when the recording process can reproduce continuous tonal values such as, for example, a proof output unit. For recording processes that can only reproduce two tonal values (white or, respectively, black) the gray scale values are converted into raster points before the recording in a raster generator that precedes the recorder, the gray scale values being simulated for the eye therewith. In the recorder, the printer's copies are exposed onto the recording material pixel-by-pixel and line-by-line with at least one exposure beam. During the exposure, control signal values determine which pixels are exposed as parts of the raster points or not in that the control signal values correspondingly switch the exposure beam on and off.

For editing the delta list, the superimpositions of the objects in the display list are suitably eliminated and the data are subsequently compressed as highly as possible. The delta list is free of overlap because it only contains o that adjoin one another and do not overlap. There is only one gray scale value for each pixel in the delta list. A compromise between a high compression factor, a fast compression and, above all, a very fast decompression must be found in the selection of the compression method.

The delta list essentially contains simple graphic objects and raster information that can be converted into bit map data and output by a raster generator keeping pace with the recorder speed. The output speed can be exactly predicted in that the inventive data format is free of overlap, as a result whereof a start/stop mode of the recorder can be avoided. The required screening speed can be calculated for every printed page in the generation of the delta list and can be potentially evaluated for the control of the raster generator or of the recorder.

The generation of the delta list and the screening can be implemented with different resolutions. An advantageous version is the calculation of the objects in the delta list with 666.5 pixels/cm (1693 dpi) and the screening of the gray scale values with 1333 pixels/cm (3386 dpi). The screening can, for example, also occure asymmetrically with 4000 pixels/cm×1333 pixels/cm (10160 dpi×3386 dpi).

The format of the delta list is byte-oriented. Each byte is a command that is followed by data bytes in some instances. The coding of the commands is selected such that an optimally great compression of the data is achieved. General information, for example the length of the delta list and the length of a scan line, are located at the start of every delta list. The delta list also contains information about the screening method according to which the objects are to be converted into bit maps by the raster generator.

A printed page can be composed of a plurality of delta lists that are potentially processed in parallel. The generation of a printed page can therefore be divided into a plurality of processes whose delta lists are then brought together (multiplexing).

Figure 4:
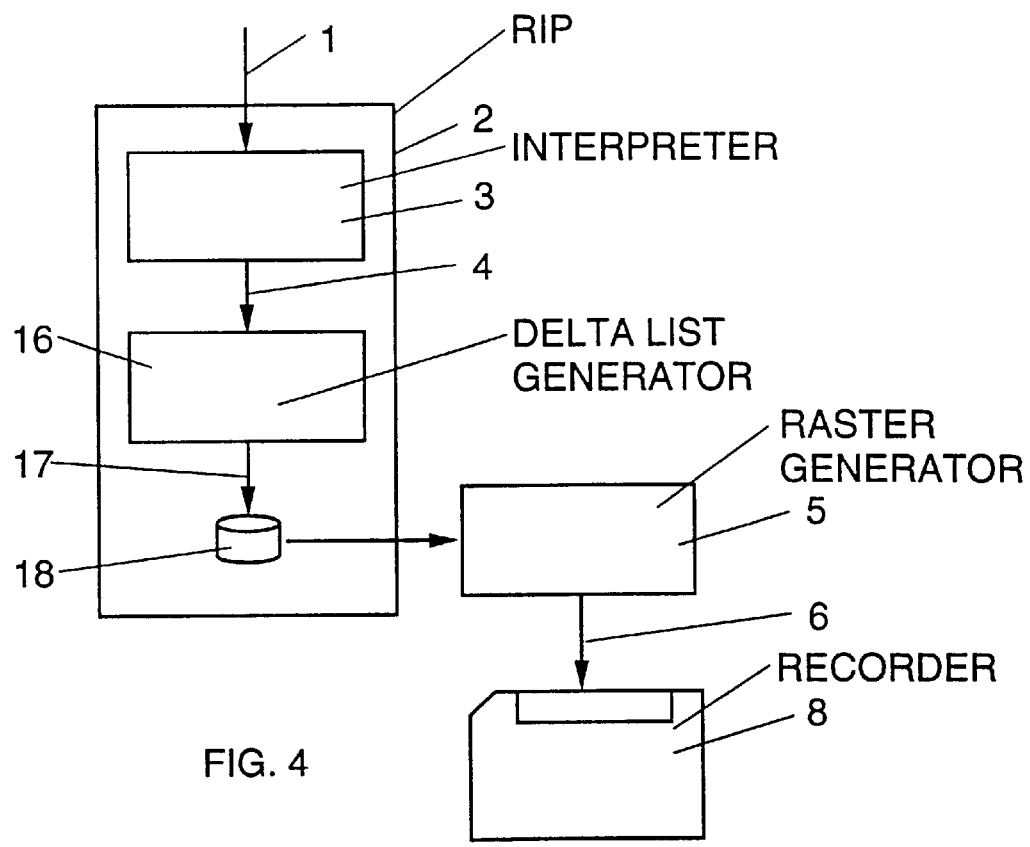
FIG. 4 shows the work in the exposure of PostScript data with the generation and further-processing of the delta list.
Figure 5:
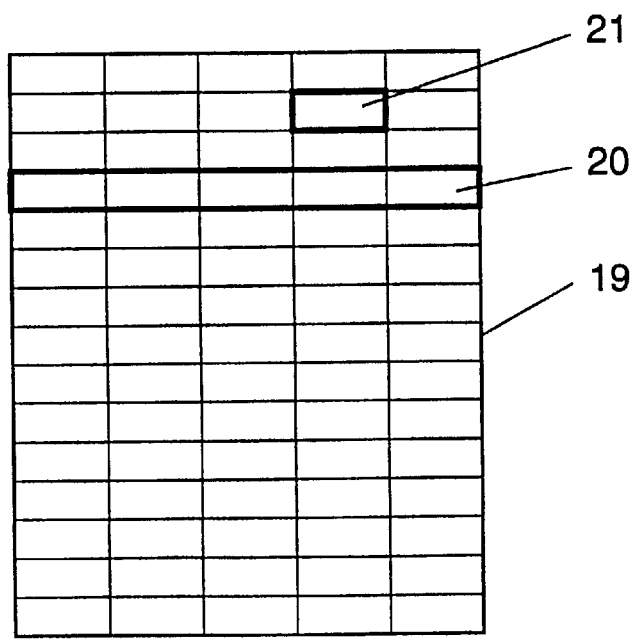
FIG. 5 is the subdivision of a printer's copy into bands and zones.

FIG. 4 shows an inventively improved work sequence for the interpretation and exposure of PostScript data wherein a contone map is generated in the data format of the delta list The PostScript data (1) that describe the content of the printer's copy are supplied to the RIP (2) where, in a first step, they are analyzed by the interpreter (3) and converted into a display list, as was already explained above. In a second step, a delta list generator (16) generates the overlap-free contone map of the delta list (17) from the display list and this is stored, for example, on a disk storage (18). At a later time, the stored delta lists of the printer's copies, for example the various color separations of a printed page, are successively called from the disk storage (18), converted into bit maps (6) by the raster generator (5) and are in the recorder (8). The screening of the delta list occurs, keeping pace with the recorder speed.

Since very different page contents with different properties with respect to the compression can occur in different parts of a printed page, the printed page is divided into horizontal strips (bands) in the generation of the delta list and these bands are further subdivided into successive sections (zones). FIG. (5) shows the division of a printer's copy (19) into bands (20) and zones (21). The height of the bands and the width of the zones is arbitrary; however, it is advantageous for the processing when the bands are all of the same height and the zones are all of the same width. It is also advantageous when the band height and the zone width are powers of 2.

Since large parts of the information on a printed page are often composed of few different gray scale values, for example only of black/white information (text), gray scale values in the delta list are encoded with different numbers of bits, for example a 1-bit gray scale value for black/white information and 8 bits per gray scale value for contone information. This technique likewise contributes to the compression of the delta list. When successive gray scale values differ only slightly, as is often the case, for example, in images, a further compression can be achieved in that the differences between the gray scale values are formed and encoded with a lower number of bits (difference coding).

The compression of the data in the inventive data format of the delta list is based on the run length method that is modified for the specific demands. Command bytes that can be accompanied by a run length and/or one or more gray scale values exist in the data stream The compression also considers repetitions of the entire content of a zone in the Y-direction (X-direction=principal scanning direction; Y-direction=secondary scanning direction). A few delta list commands and their encoding that are important for understanding the generation of the delta list are explained by way of example in the following table.

---

Start of a new band:
$$\text{LHD\_BAND} \frac{\text{Byte 0}}{0000\ 0011}$$

Start of a new line in the band:
$$\text{LHD\_START} \frac{\text{Byte 0}}{0000\ 0001}$$

Start of a new zone in the line:
$$\text{LHD\_ZONE} \frac{\text{Byte 0}\quad \text{Byte 1}\quad \text{Byte 2}}{0000\ 0010\ \ Y-\text{cmpr}\ \ \text{bits}}$$

Y-cmpr = number of repetitions in Y-direction
bits = number of bits per gray scale value (1, 8, 12)

Selection of a screening method:
$$\text{LHD\_SCREEN} \frac{\text{Byte 0}\quad \text{Byte1}}{0000\ 1000\ \text{index}}$$

index = number of the screening method for the following gray scale values

Short run length:
$$\text{LHD\_REPEATS} \frac{\text{Byte 0}\quad\quad \text{Byte 1}}{01\text{nn}\ \ \text{nnnn gray scale value}}$$

The gray scale value is repeated (nnnnnn + 1) times.

Long run length:
$$\text{LHD\_REPEAT} \frac{\text{Byte 0}\quad\quad \text{Byte 1}\quad\quad\quad \text{Byte 2}}{0001\ \text{nnnn}\ \text{kkkk}\ \ \text{kkkk gray scale value}}$$

The gray scale value is repeated
([nnnn] × 256 +
[kkkk kkkk] + 1) times.

Uncompressed data:
$$\text{LHD\_UCDATA} \frac{\text{Byte0}\quad\quad \text{Byte 1}\quad\quad\quad \text{Byte2}\quad ...}{001\text{n}\ \text{nnnn grayscale value 1 grayscale value 2 ...}}$$

(nnnnn + 1) uncompressed gray scale values follow.

---

The first byte or, respectively, the first bits in the first byte of each command are an indication of the command that is involved and of how many bytes with parameters for the c follow. This structure assures that each command can be unambiguously recognized and correctly interpreted in the decoding of the delta list.

Each new band is initiated with the command LHD_BAND and each new line within the band is initiated with the command LHD_START. The command LHD_ZONE wherein the number of lines over which the content of this zone repeats in Y-direction is encoded with the parameter "Y-cmpr" stands at the start of every zone in the line. For reasons of a simple and fast processing, the compression in Y-direction is only implemented when all run lens in the zone repeat in the following lines but not when only individual run length from the zone repeat. The parameter "bits" indicates the number of bits with which the gray scale values we encoded within the zone, for example 1 bit for black/white information, 8 bits for contone information with normal graduation (256 steps) and 12 bits for contone information with finer graduation (4096 steps).

A screening method that is identified by the parameter "index" is selected with the command LHD_SCREEN. The raster generator should screen all following gray scale values in the delta list with the selected screening method until a new screening method is selected again. The parameters of the screening method such a screen width, screen angle, raster dot shape are stored under the number "index" in the raster generator or they are attached to the generated delta list with further delta list commands.

A run length of repeating gray scale values within a zone is described with the commands LHD_REPEATS or LHD_REPEAT. In the command LHD_REPEATS, a 6bit binary number [nnnnnn] in the first byte encodes a run length between 1 and 64; a run length between 1 and 4096 is encoded in the command LHD_REPEAT by a 12bit binary number ([nnnn] in the first byte and [kkkk kkkk] in the second byte). The last byte of this command respectively indicates the gray scale value that should be repeated.

When successive gray scale values in the line are not the same and can therefore not be compressed with a run length, such a sequence is described with command LHD_UCDATA. A 5-bit binary number [nnnnn] in the first byte indicates how many uncompressed gray scale values follow.

Figure 6A:
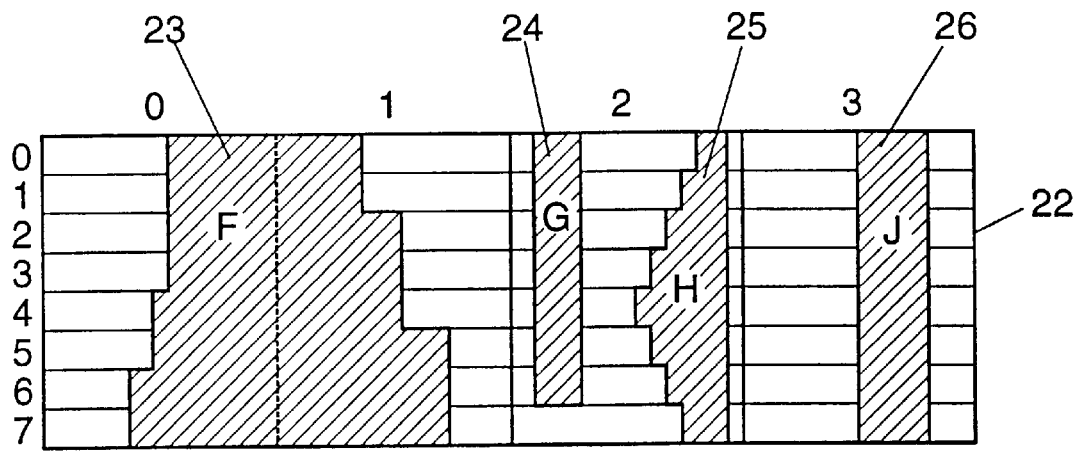
FIG. 6 is an example of the compression in Y-direction.
Figure 6B:
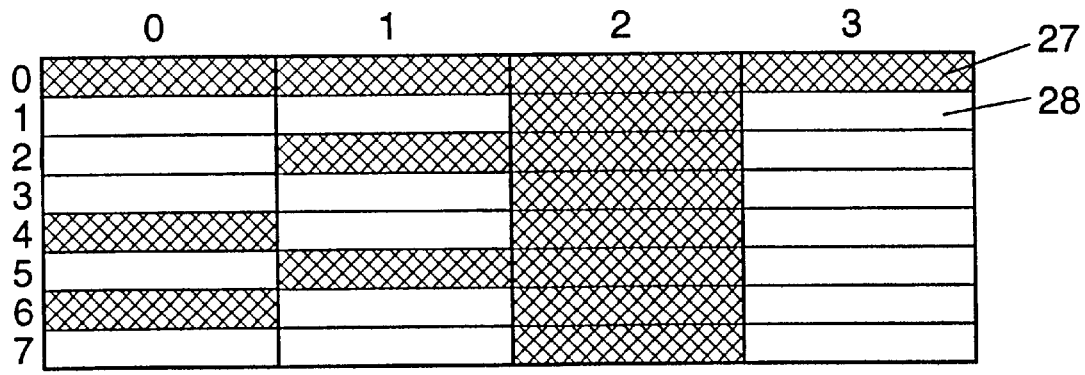

FIG. 6a shows a band excerpt (22) with four zones per line (numbered from 0 to 3). FIG. 6b shows the zones for which data are generated in the generation of the delta list and for which zones no data are generated due to the compression in Y-direction. The band excerpt (22) in FIG. 6a is 8 lines high (numbered from 0 to 7) and contains the graphic objects F (23), G (24), H (25) and J (26). The object F (23) extends over the zones 0 and 1 in every line. In the generation of the delta list, however, the run lengths are not determined over the entire object in this case but separately within each zone and independent of the neighboring zones in X-direction. The object F (23) is thus divided into two sub-objects, one in zone 0 and one in zone 1. The run lengths are the same in the lines 0 through 3 in zone 0. Only the run lengths in the line 0 are therefore coded and entered into the delta list, whereby it is noted in the command LHD_ZONE that the run length are also valid for the three following lines of this zone. Run lengths thus need not be coded and entered in the lines 1, 2, 3 of the zone 0. The run lengths in the lines 4 and 5 of zone 0 are also the same and in lines 6 and 7, so that run lengths are generated and added to the delta list only in lines 4 or, respectively, 6. Shaded zones 27 in FIG. 6b identify the zones for which delta code is generated and non-shaded zones (28) are those for which no code was generated.

The run lengths in the zone 1 are generated independently of those in the zone 0 even though they belong to the same object F (23) in this case. According to the above-explained principle of compression in Y-direction, the run lengths are coded here in the lines 0, 2 and 5.

A different run length arrangement derives for each line in the zone 2, so that run length code is generated for each of the 8 lines. Although the run lengths for the object G (24) are the same over the first 7 lines, the object H (25) has a different run length distribution in every line. The run length distribution is the same over the entire band height in zone 3, so that run lengths are only generated for the first line.

In the generation of the delta list, the lines of a band are processed from top to bottom and the zones of a line are processed from left to right. The generated commands and run lengths are thereby joined to one another tightly packed, i.e. nothing is entered in the delta list for the zones for which no run lengths are generated. As a result of the code for the compression in Y-direction in the command LHD_ZONE, the raster generator can decode the delta list such that the run lengths are again allocated to the correct zones.

Storing in the Intermediate Buffer

In the generation of the delta list, a conversion of simple graphic objects occurs into a run length coded format that is free of overlap. An intermediate buffer in which the start positions and further parameters of the objects encountered in the display list are entered is required for generating overlap-free graphic objects. There is such an intermediate buffer for each zone. The organization of the intermediate buffer is Own in FIG. 7a. Because of the simpler graphic presentation, the zone width is assumed as 32 pixels in the example discussed here; in a practical realization of the invention, however, the zones would be selected wider, for example 1024 pixels.

The intermediate buffer for a zone is divided into four areas (I through IV). A compressed presentation of a zone in the form of a bit map in which the corresponding bit for each start position of an object is set to "1" is located in the area I. The left edge of the object is valid as a start position for each line. For a more compact presentation, the respective content of the bit map is indicated as hexadecimal numbers in FIG. 7a and the following drawings, i.e. a hexadecimal number between "0" and "F" for respectively 4 bits. 8 hexadecimal numbers thus describe the 32 bits in each line of the area I.

A status information for the lines of the zone is deposited in the area II. For example, possible statuses are "free" (F), "rectangle" (R) and "start" (S). "Start" (S) identifies the lines of the objects at which a new object begins in Y-direction.

The plurality of repetitions in Y-direction is entered in the area III for an object.

A data structure as shown in FIG. 7b is entered in the area IV for each start position. The data structure is composed of 8 bytes, numbered from 0 to 7, and contains four identification elements, namely "object number" (object no.), "screening" (screen), "gray scale value" and "run length" (length). The "object number" is a consecutive numbering of the objects entered in the delta list, whereby objects with higher numbers can superimpose on objects with lower numbers. The "object number" is stored in the data structure as a 32-bit binary number and occupies the first four bytes of the data e. The identification element "screening" occupies the fifth byte of the data structure and indicates the number of the screening method with which the respective object is to be screened. The parameters of the screening can be called by the raster generator under the "screening" number. The identification element "gray scale value" in the sixth byte of the data structure indicates the gray scale value of the object. The last two bytes of the data structure indicate the run length of the object in the corresponding line of the zone as a 16-bit binary number in the identification element "length".

The data structure of FIG. 7b is valid for a delta list that describes a printer's copy with only one gray scale value per pixel, i.e., for example, for a color separation. Instead of an individual gray scale value, alternatively a color value with a plurality of color components, for example the color separation values C, M, Y and K, can also be indicated. A correspondingly modified data structure for the area IV of the intermediate buffer is shown in FIG. 7c. The following explanation of the method, however, is based on a delta list with one gray scale value per pixel, i.e. with a data structure according to FIG. 7b.

At the beginning, the intermediate buffer is initialized in that a "dummy object" with the data structure "L" of FIG. 7d is entered into all rows. The identification elements of the structure "L" are likewise shown as hexadecimal numbers. The "object no." is zero; the screening method number 1 is entered for "screen"; the gray scale value is $FF_{hex}$=255 (the value for white); and the "length" is $20_{hex}$=32 (the width of the zone). The data structure thus describes a white run length that extends over the entire width of the zone. This data structure for the "dummy object" is entered into column 0 of the area IV.

Correspondingly, the first bit is set to "1" in all rows of the bit map in area I, i.e. the first hexadecimal number is $8_{hex}$. The bit map in area I serves as an aid in order to find the next run length in a zone faster in the generation and further-processing of the delta list. For sections in the bit map that contain only zeroes ("0"), the corresponding sections in area IV need not be searched and processing time is saved.

In area II, all rows are identified as "free" (F); the first row is additionally identified as "start" (S) since it is the starting row of the "dummy object" as seen in Y-direction. Finally, how often the run length in the respective line repeats in the following lines as well is entered bin the area III. The run length in line 0 repeats in the 7 following lines; the run length in line 1 repeats in the following 6 lines, etc.

What data are respectively entered in the intermediate buffer when the objects A through E (11, 12, 13, 14, 15) from the display list are processed in sequence is explained below with reference to FIG. 8 through FIG. 12.

When a new object is entered in an intermediate buffer, all areas (I through IV) must be updated. FIG. 8a shows the entry of an object A that is characterized by the following parameters:

| Object A: object number = 1 | |
|---|---|
| screening = 1 | gray scale value = 128 |
| start coordinate Y = 1 | height = 4 lines |
| start coordinate X = 4 | length = 10 pixels |

Corresponding to the position of the object A in the zone, the data structure A (FIG. 8b) is entered into the column 4 of the rows 1 through 4 of the area IV. The object has the "object no." 1, the "screening"1, the "gray scale value " 128=$80_{hex}$ and the "length" 10=$A_{hex}$. The bits corresponding to column 4 are set in the affected rows in area I. In area II, the status "rectangle" (R) is entered into rows 1 through 4 and the feature "start" (S) is additionally entered into row 2. In the area III, the number of repetitions in Y-direction is entered, "3" repetitions in row 1, still "2" repetitions in row 2, etc.

In this phase of the processing, only the repetitions of the most recently handled object are entered in area III when these repetitions are less than or equal to the repetitions that have already been entered. As explained later, this rule assures that the lines of a zone that repeat in all run lengths can be identified in the further-processing. That the repetition "7" previously entered in the row 0 is no longer valid after entry of the object A is first left out of consideration and is cleared up in a later processing phase.

Figure 3:
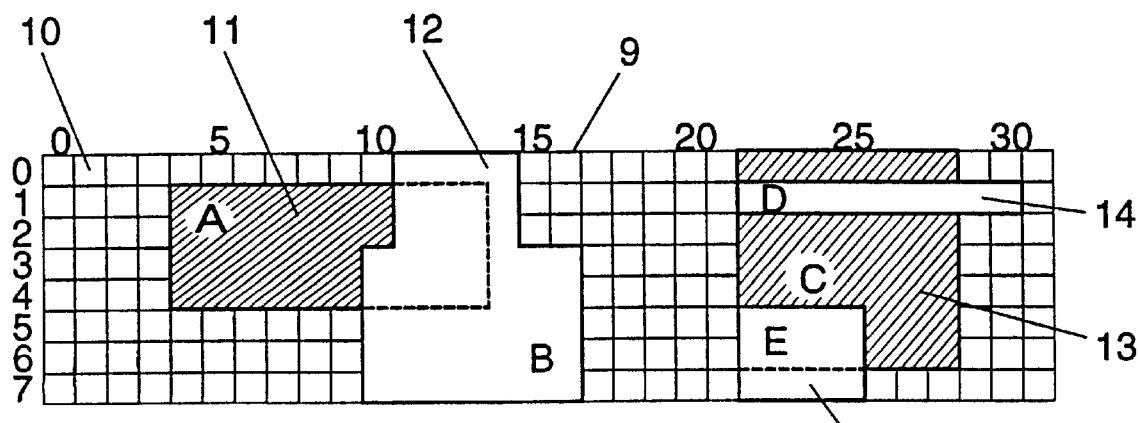
FIG. 3 is an excerpt from a band with objects that the interpreter generates.
Figures 9A, 9B:
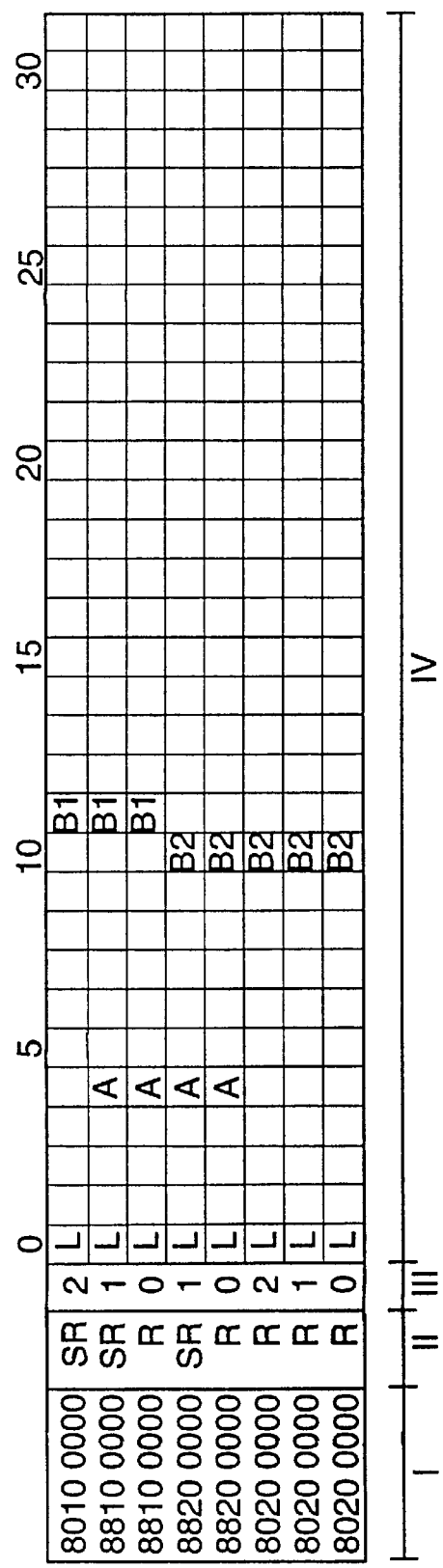
FIG. 9 shows the intermediate buffer after entry of the object B.

FIG. 9a shows the entry of the object B from FIG. 3. Since the object has an irregular boundary at the left and right edge, it is divided into rectangular horizontal strips that are entered into the intermediate buffer as separate sub-objects. All sub-objects should have the same "screening" (=1) and the same "gray scale value" (=4); only the start point as well as the height and length of the sub-objects is different. Since two new objects B1 and B2 now arise from the original object B, they receive consecutive, new "object numbers" 2 and 3. The following parameters thus derive for the two sub-objects B1 and B2:

| Object B1: Object Number = 2 | |
|---|---|
| Screening = 1 | Gray scale value = 4 |
| Start coordinate Y = 0 | Height = 3 lines |
| Start coordinate X = 11 | Length = 4 pixels |
| Object B2: Object Number = 3 | |
| Screening = 1 | Gray scale value = 4 |
| Start coordinate Y = 3 | Height = 5 lines |
| Start coordinate X = 10 | Length = 7 pixels |

FIG. 9b shows the data structures for the sub-objects that are entered in area IV of the intermediate buffer. The entries into the areas I and III ensue according to the rules explained for the object A. The repetitions "2", "1" and "0" are entered in rows 0 through 2 for the object B1. However, the repetitions "4" and "3" are not entered in the rows 3 and 4 for the object B2 because these repetitions are greater than the repetitions "1" and "0" that are already present and still derive from the object A. However, the repetitions "2", "1" and "0" are entered in the rows 5 through 7 for the object B2, as a result whereof, though, the content of the area III is not changed in these rows since these repetitions were already entered by the "dummy object" L. As already explained, the features "S" and "R" are entered in area II for the new objects, whereby, however, the feature "S" of the object A entered earlier is not erased in row 1.

Figure 10A:
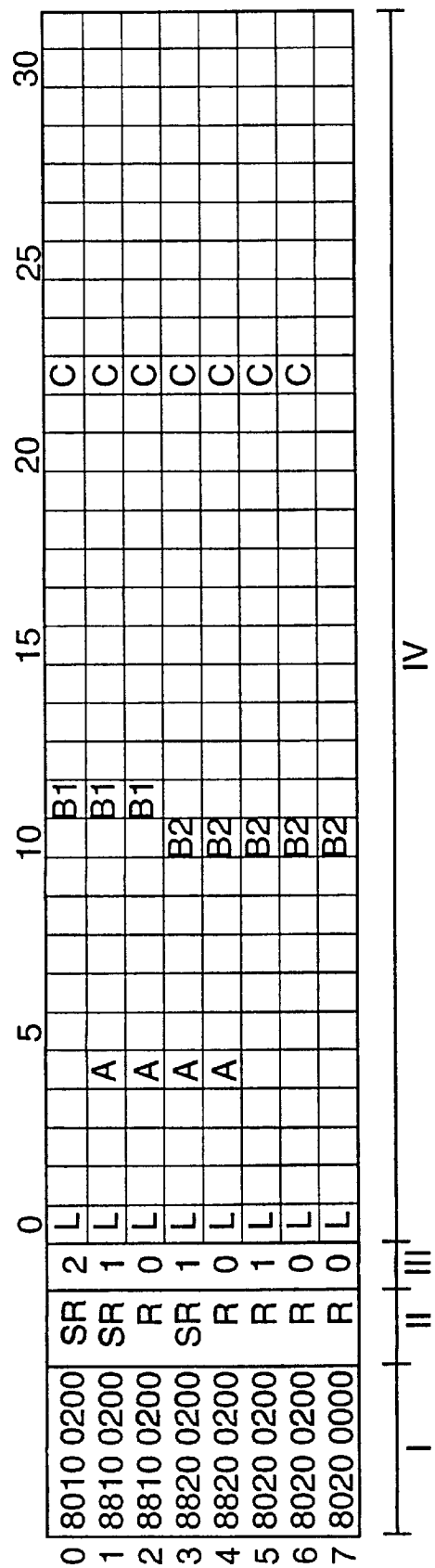
FIG. 10 shows the intermediate buffer after entry of the object C.
Figure 10B:
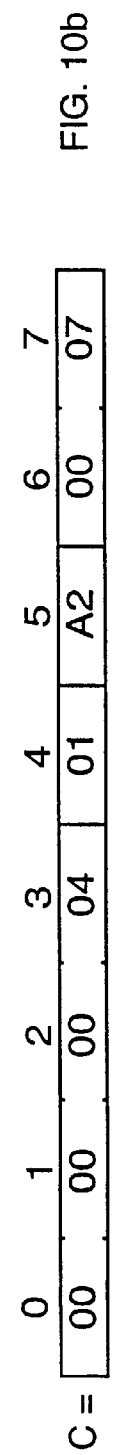

FIG. 10a the entry of the next object C from FIG. 3. FIG. 10b shows the data structure belonging to the object. The object has the "object number" 4 and should have the "screening" 1 and the "gray scale value" 162=$A2_{hex}$. The parameters of the object are:

| Object C: Object Number = 4 | |
|---|---|
| Screening = 1 | Gray scale value = 162 |
| Start coordinate Y = 0 | Height = 7 lines |
| Start coordinate X = 22 | Length = 7 pixels |

The entry of the data structure (FIG. 10b) and of the other characteristics into the areas of the intermediate buffer ensues according to the above-explained rules.

Next, the objects D and E from FIG. 3 must be entered into the intermediate buffer. The special case thereby occurs that the start points of the new objects fall onto start points already occupied in the intermediate buffer (occupied by the object C). A distinction is thereby made between two cases dependent on whether the new object is longer than or of the same length as the object already entered (case 1) or is shorter (case 2). Case 1 is represented by the new object D; case 2 by the object E.

FIG. 11a shows the entry of the object D and FIG. 11b shows the appertaining data structure. The object receives the consecutive "object number" 5 and should have the "screening" 2 and the "gray scale value" 51=$33_{hex}$. Its parameters are thus:

| | |
|---|---|
| Object D: Object number = 5 | |
| Screening = 2 | Gray scale value = 57 |
| Start coordinate Y = 1 | Height = 1 line |
| Start coordinate X = 22 | Length = 9 pixels |

In this case 1, the existing start point for the object C in row 1 of the intermediate buffer is overwritten by the new start point for the object D since the new object D is longer than the object C that has already been entered. Since the new object D in this line completely covers the object C lying thereunder and object C therefore does not appear in the output of the printer's copy (in this line of the zone), the information for object C need not be kept.

With the entry of the object E, FIG. 12a shows an example of case 2, to wit that the new object is shorter than the object C already entered and therefore only covers it partially. FIG. 12b shows the data structures that are used in this case. The object receives the consecutive "object number" 6 and should have the "screening" 2 and the "gray scale value" $85=55_{hex}$. Its parameters are thus:

| | |
|---|---|
| Object E: Object number = 6 | |
| Screening = 2 | Gray scale value = 85 |
| Start coordinate Y = 5 | Height = 3 lines |
| Start coordinate X = 22 | Length = 4 pixels |

Since the information of the object C in rows 5 and 6 of the intermediate buffer is still used for the output of the printer's copy in this case, the start points entered therein are shifted one position toward the right, whereby the length of the object C in these lines must be shortened by one pixel so that the right-hand edge of the object C is not falsified. This means that the object C is replaced by a new object C1 in lines 5 and 6 that is shifted one pixel toward the right and is one pixel shorter at the same time. The "object number", the "screening" and the "gray scale value" for the object C1 are taken from the object C (FIG. 12b). It thus has the parameters:

| | |
|---|---|
| Object C1: Object number = 4 | |
| Screening = 1 | Gray scale value = 162 |
| Start coordinate Y = 5 | Height = 2 lines |
| Start coordinate X = 23 | Length = 6 pixels |

The "object number" must be the same as for the object C so that object C1 together with the rest of object C in the same superimposition plane describes the same area as the original object C. After the entry of the object C1, the new object E can also be entered in the intermediate buffer since the positions required therefor in the intermediate buffer are now free. When the shifted start position of object C1 likewise falls onto a position that is already occupied in the intermediate buffer, the object C1 is shifted farther toward the right in steps (and correspondingly shortened) until a free position in the intermediate buffer has been encountered into which the object C1 can be entered.

Figure 13:
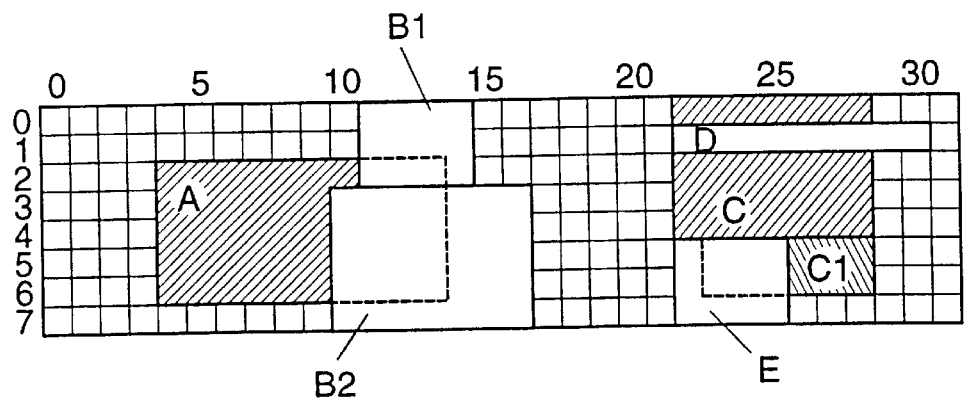
FIG. 13 shows the objects entered into the intermediate buffer.

All of the objects entered in the intermediate buffer are shown again together in FIG. 13.

For a better understanding thereof, the sequence of the method set forth up to now for entering the objects found in the display list into the intermediate buffer are explained again in greater detail on the basis of flowcharts (FIG. 15 through FIG. 19). The general case in FIG. 14 thereby forms the basis.

Figure 14:
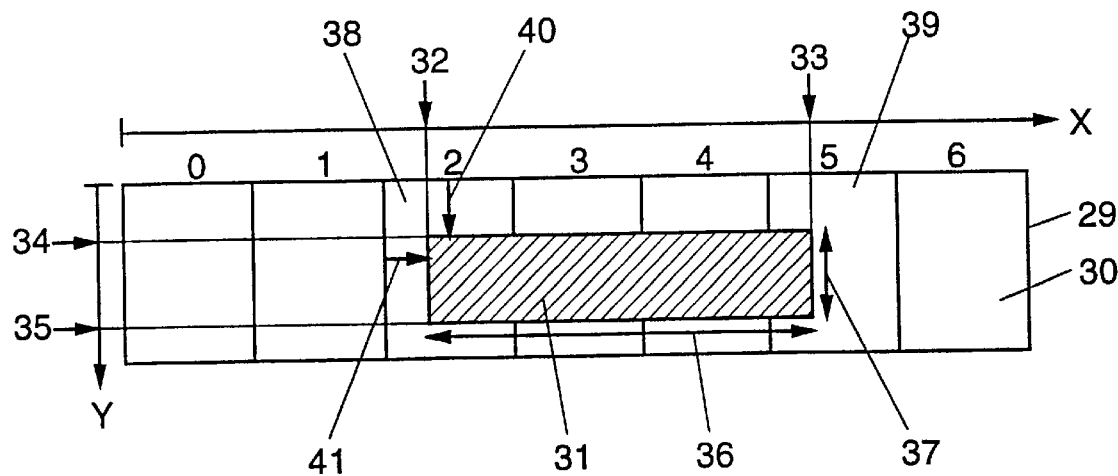
FIG. 14 shows an object that extends over a plurality of zones.

FIG. 14 shows a band (29) with—in this example—seven zones (30) numbered from 0 through 6 in which an object (31) extends over a plurality of zones. With respect to the start of the band (upper left corner of the band), the object has the coordinates "Xstart" (32), "Xend" (33). "Ystart" (34) and "Yend" (35). It has the length "Xrange" (36) and the height "Yrange" (37), begins in the "StartZone" 2 (38) and end in the "EndZone" 5 (39). The start coordinates wit respect to the upper left corner of the "StartZone" (38) are "Xobject" (41) and "Yobject" (40), whereby "Yobject"= "Ystart" applies.

Figure 15:
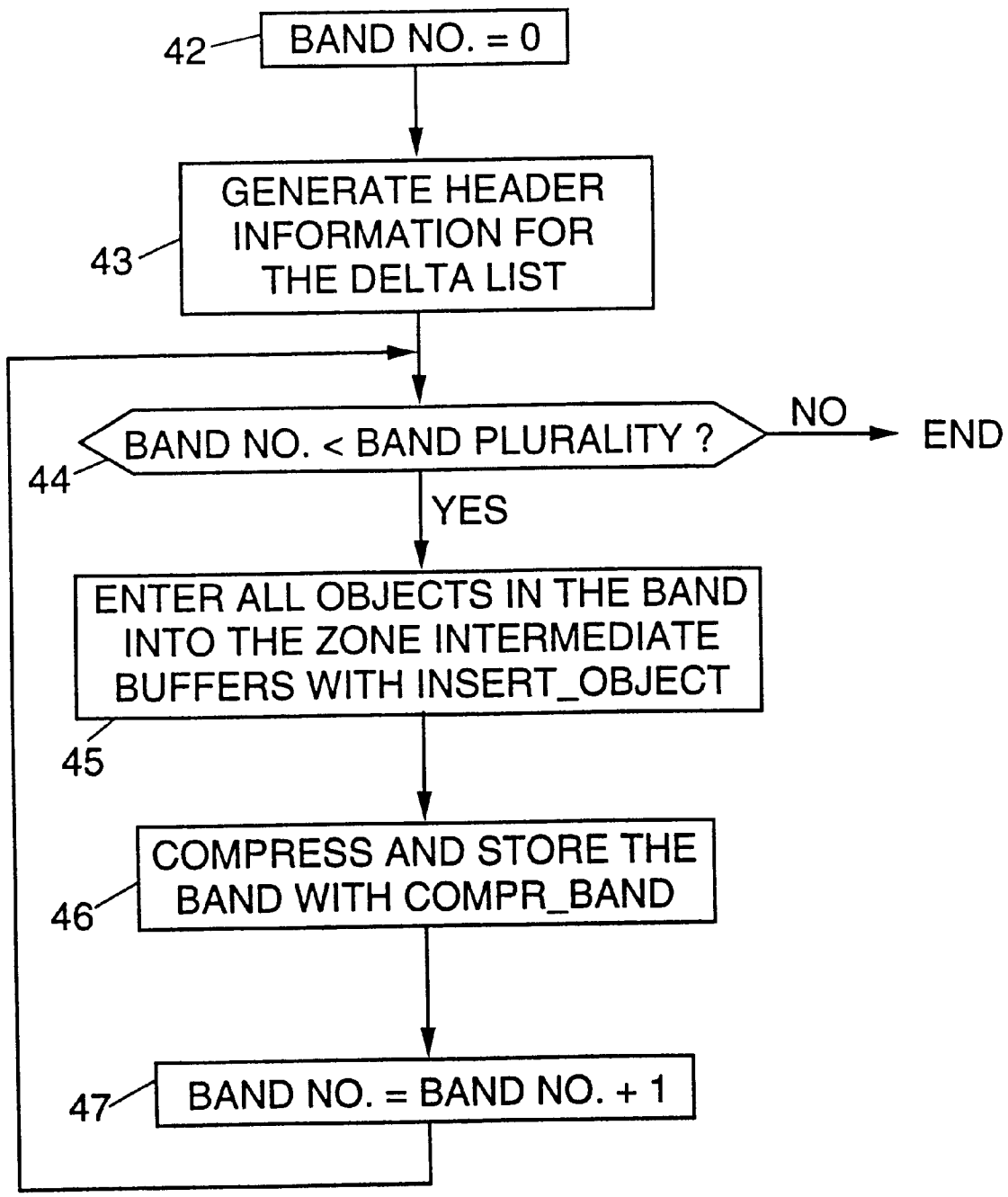
FIG. 15 is a flowchart for generating the delta list.

The principal steps for generating a delta list for a printer's copy are shown in the flowchart of FIG. 15. Since the delta list is generated band-by-band from top to bottom, the "BandNo." is first set to zero in step 42.

Header information for the delta list are subsequently generated and stored in step 43. For example, the header information contains parameters such as the plurality and height of the bands, the plurality and width of the zones, the resolution in X-direction and Y-direction, a job identification and other generally valid information. A check is carried out in step 44 to see whether the number of the next band to be processed is lower than the plurality of bands. When this is the case, the page has not yet be completely processed; otherwise, the processing has been ended.

In step 45, all objects encountered in the band are entered into the zone intermediate buffers with the method steps combined under "INSERT_OBJECT". Subsequently, in step 46, the run lengths entered in the zone intermediate buffers are compressed with the method steps combined under "COMPR_BAND", are converted into the format of the delta list and stored. Subsequently, in step 47, the "BandNo." is incremented by one and a branch is made back to the interrogation 44 to check whether the processing has now been ended.

Figure 16:
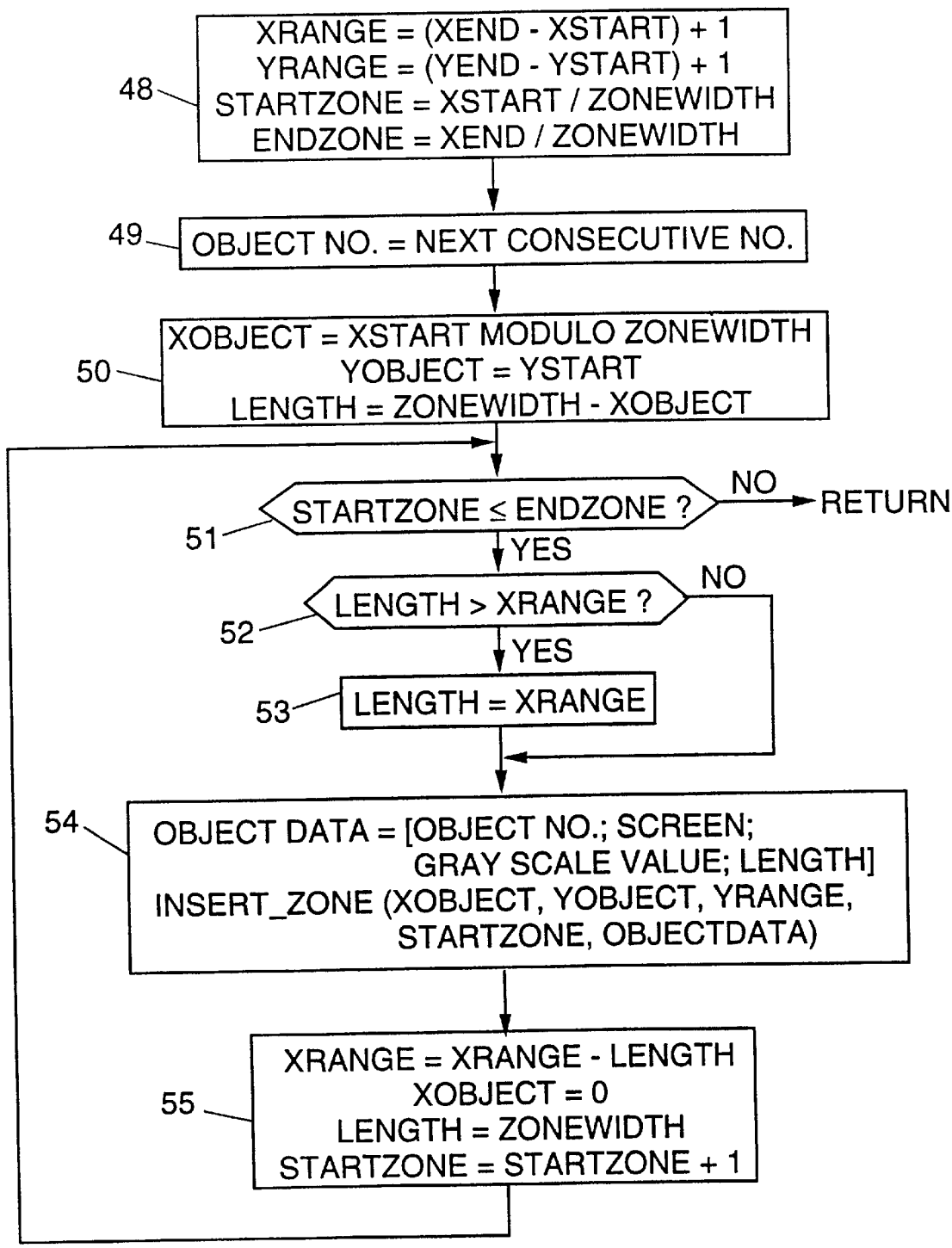
FIG. 16 is a flowchart for the entry of an object into a plurality of zones of the intermediate buffer.

FIG. 16 shows the method steps that were combined in FIG. 15 under "INSERT_OBJECT". In step 48, the length "Xrange" and the height "Yrange" is calculated from the coordinates of the corner points of the object. Further, the "StartZone" in which the object starts and the "EndZone" in which it ends is identified by whole-number division by the zone width.

In step (49), the next consecutive object number is assigned to the object. In step (50), the coordinates of the object start (upper left corner) "Xobject" and "Yobject" with reference to the start of the "StartZone" is determined, as is the length of the part of the object ("length") that lies in the "StartZone".

In the processing loop (51) through (55), the object is subdivided into sub-objects corresponding to the zones between "StartZone" and "EndZone", whereby one sub-object is allocated to each zone. The sub-length ("length") and the X-coordinate ("Xobject") with reference to the left edge of the zone are determined for each sub-object. A check is carried out in the interrogation 51 to see whether the "StartZone" is smaller than or equal to the "EndZone". If yes, the entering of the object in the intermediate buffer is continued; if no, the entering is terminated. The check in the interrogation 52 to see whether the most recently identified sub-length of the object ("length") is greater than the original length of the object ("Xrange") is required, for example, in that case wherein the left and right edge of the object are located in the same zone. The sub-length ("length") determined in step (50) would then be too long and would be limited to the actual object length in step (53). The interrogation (52) and the step (53) also limit the sub-length "length" to the remaining length of the object of the object when the sub-object lying in the "EndZone" is processed.

In step 54, the data structure "ObjectData", as was already explained in FIG. 7b, is formed from the parameters "ObjectNo.", "Screen", "Gray scale value" and "length" for the sub-object being processed at the moment. The entering of the sub-object into the affected lines of the current zone is combined under "INSERT_ZONE". As parameters, "INSERT_ZONE" employs the start coordinates of the sub-object ("Xobject", "Yobject"), the height ("Yrange"), the number of the current zone ("StartZone") and the data structure ("ObjectData").

The processing of the next sub-object is prepared in step 55. The (remaining) length of the object ("Xrange") is shortened by the sub-length ("length") that was just entered, the X-coordinate ("Xobject") is set to zero, the sub-length ("length") is set equal to the zone width, and the number of the zone ("StartZone") is incremented by one. Subsequently, the processing branches back to the interrogation 51.

Figure 17:
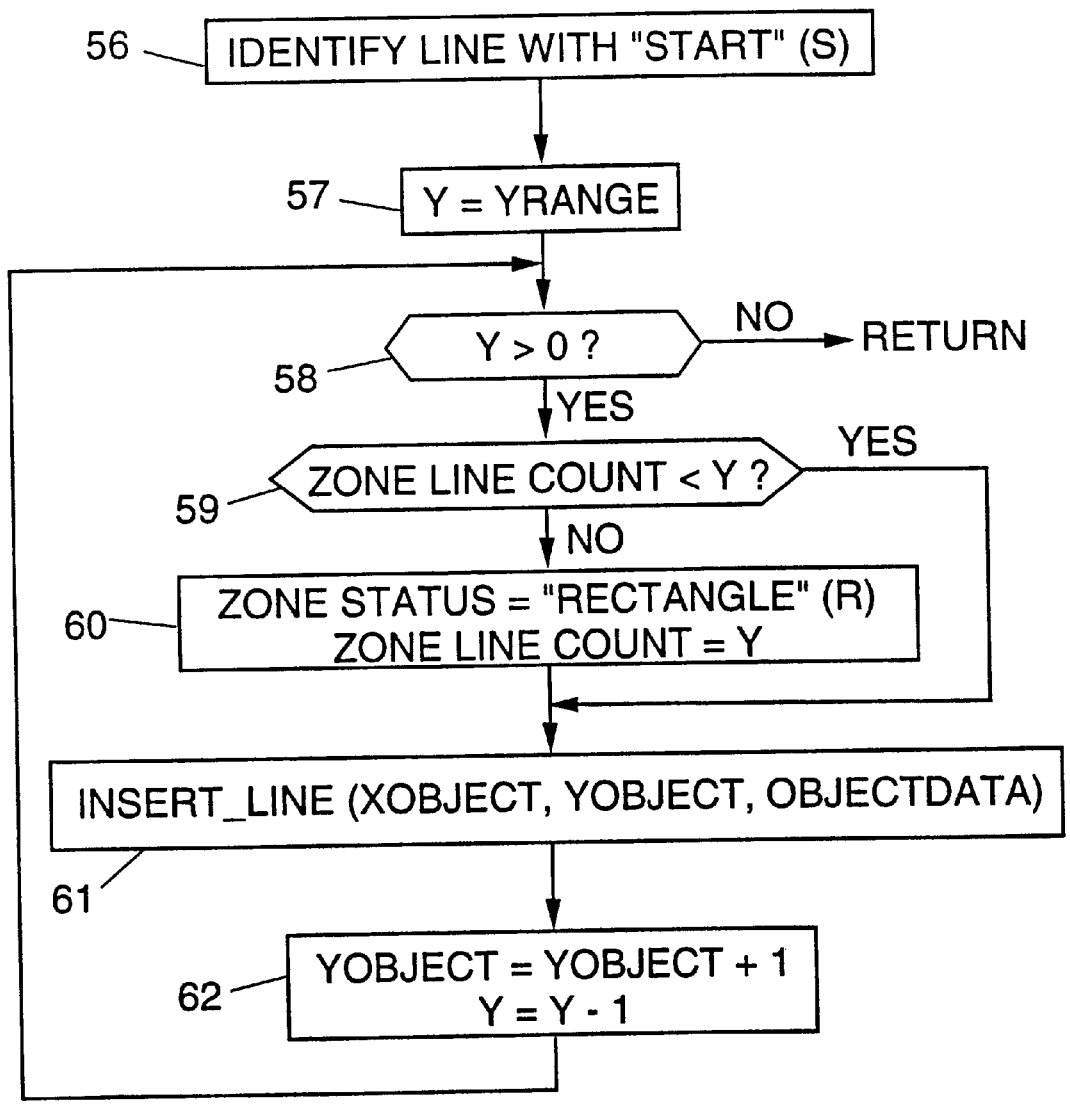
FIG. 17 is a flowchart for the entry of an object into a zone of the intermediate buffer.

FIG. 17 shows the method steps that were combined under "INSERT_ZONE" in FIG. 16. In a processing loop, "INSERT_ZONE" enters the data structure "ObjectData" and the further characteristics into the areas I through IV of the intermediate buffer for the current zone line-by-line.

In step 56, the first line of the sub-object is identified as "Start" S in area II. In step 57, a variable "y" for counting off the lines is set to "Yrange" for the control of the loop execution. A check is carried out in the interrogation 58 to see whether lines still remain to be entered. If no, the processing is ended. If yes, a check is carried out in the interrogation 59 to see whether value for "ZoneLineCount" already present in the intermediate buffer is smaller than "y". When this is the case, it dare not be overwritten by higher values, as was already explained in conjunction with FIG. 8 and FIG. 9, since the repetition of entire zone cells is otherwise not correctly perceived later. When the existing values for "ZoneLineCount" is greater than or equal to "y", then "rectangle" (R) is entered for the "Zone status" in area II of the intermediate buffer in step 60 and the "ZoneLineCount" is set to "y".

In step 61, the data structure "ObjectData" is then entered into the position of the area IV in the intermediate buffer determined by the coordinates ("Xobject", "Yobject"). This operation is combined under "INSERT_LINE". In step 62, the Y-coordinate "Yobject" is incremented by one and the line counter "y" is deincremented by one for preparing for the next line. Thereafter, the processing branches back to the interrogation 58.

Figure 18:
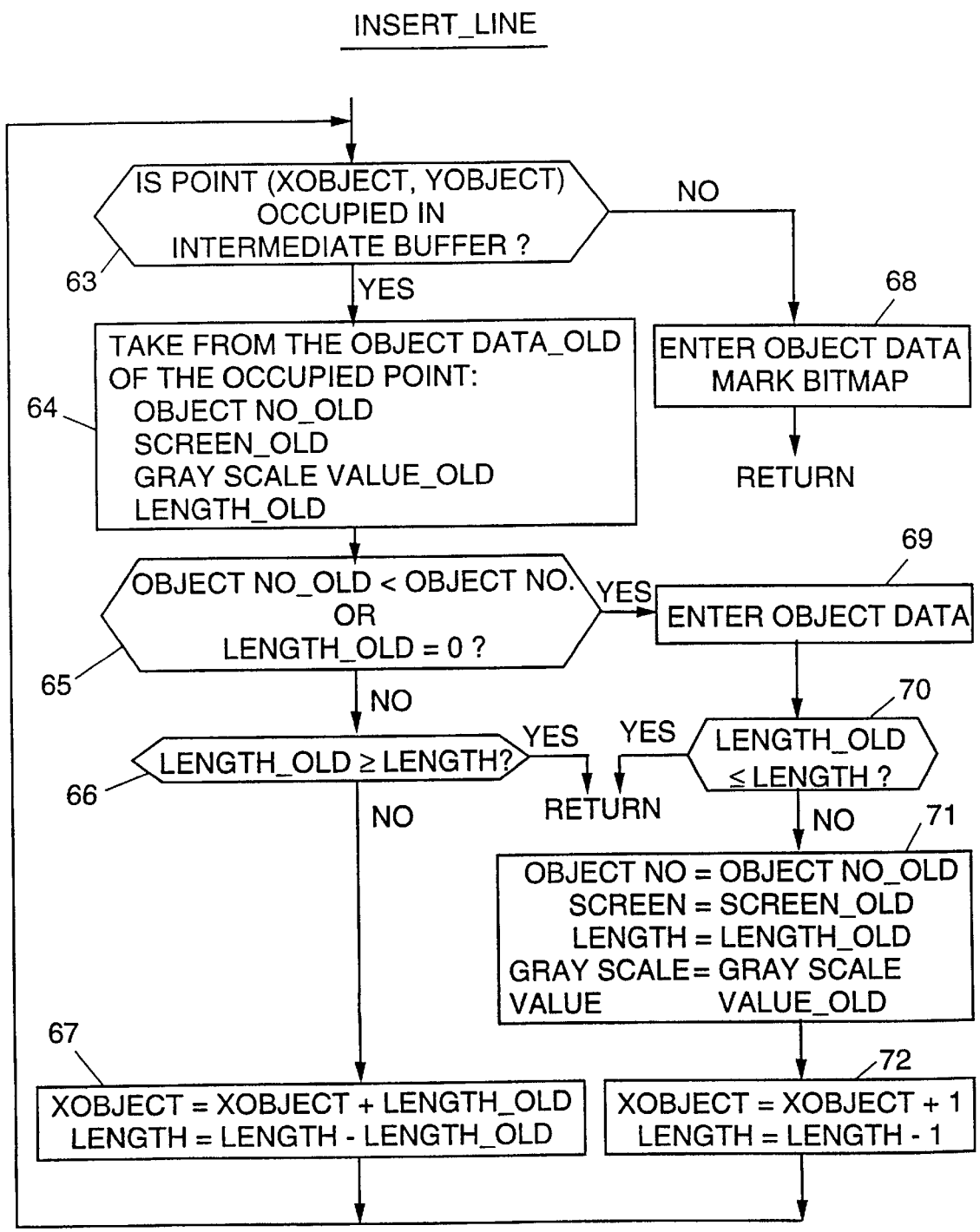
FIG. 18 is a flowchart for the entry of an object into a row of the intermediate buffer.

FIG. 18 shows the method steps that were combined in FIG. 17 under "INSERT_LINE". In the interrogation 63, a check is first carried out to see whether the position at the coordinates ("Xobject", "Yobject") in the intermediate buffer is already occupied with a data structure. If no, the data structure "ObjectData" is entered in area IV in step 68 and the corresponding position is marked in the bit map in area I.

When a data structure is already entered at the current position, the parameters of this existing structure are stored in the variables "ObjectNo.-old", "Screen_old", "Gray scale value_old" and "Length_old" in step (64). Subsequently, a check is made with the interrogation (65) to see whether the "ObjectNo." of the new object is higher than that of the old object, i.e. whether the new object covers the old object, or whether the "length" of the old object has become zero due to shifting and shortening, i.e. the old object drops out. In both instances, the "ObjectData" are entered in area IV in step (69). The bit map is not modified since the current position is still marked proceeding from the old object.

After the entering of the "ObjectData", a check is carried out in the interrogation (70) whether the "length" of the old object is less than or equal to that of the new object. When yes, the new object covers the old object completely in this line and nothing more can be done. This case was already explained with reference to the example of the object D in FIG. 11. When the new object is shorter than the old, the old object is shifted one position toward the right and is simultaneously shortened by one pixel. Another new object is formed therefrom. To that end, the parameters of the old object are transferred into the further new object in step 71, and, in step 72, the X-coordinate of the old object incremented by one is formed as X-coordinate ("Xobject") of the further new object and its "length" is shortened by one. This was already explained earlier with reference to the example of the object C1 in FIG. 12. Subsequently, the processing branches back to the interrogation 63, so that the old object shifted by one position and shortened can be entered in the intermediate buffer as new object.

When, as a result of the interrogation 65, the new object encounters an old object whose "ObjectNo." is not lower than the new "ObjectNo.", i.e. that it dare not cover, two instances are again to be checked in the interrogation 66 (such a new object can arise due to the above-described operation of shifting and shortening). When the old object is longer than or of the same length as the new, the new object is completely covered by the old and nothing further is to be done. When the old object is shorter than the new, a remaining length of the new objects projects beyond the old, and the new object is shortened to this remaining length in step 67 and its X-coordinate "Xobject" is correspondingly shifted. Subsequently, the processing branches back to the interrogation 63, so that the shifted and shortened new object can be entered in the intermediate buffer.

The Generation of the Delta List

After the editing and entering of the objects into the zone intermediate buffers of a band, the data in the intermediate buffer are compressed in Y-direction and in X-direction and encoded in the format of the delta list and stored in the following method steps. The superimpositions of the objects are thereby simultaneously eliminated, so that the delta list only contains objects that, seamlessly joined with one another, describe the printer's copy to be exposed. These method steps had been combined under "COMPR_BAND" in FIG. 15. They are explained on the basis of the flowchart in FIG. 19.

The processing in a band ensues line-by-line from top to bottom and zone-by-zone within each line from left to right. In step 73, all zones that have not changed in Y-direction compared to the corresponding zone in the preceding line are found and identified in the intermediate buffer. This work step is combined under "COMPR_Y" and will be explained in detail later.

In step 74, the delta command LHD_BAND with which the beginning of a band is identified is generated and stored in the delta list. In step 75, a line counter "Line" is set to zero and a check is carried out in the interrogation 76 to see whether the line counter is still within the band height. If no, the processing is ended; if yes, the delta command LHD_START that identifies the beginning of a line is generated and stored in the delta list. In step 78, a zone counter "Zone" that counts off the zones within the line is set to zero. When it is found in the interrogation 79 that the end of the Fe line has been reached, the line counter is incremented by one in step 80 and a branch is made back to step 75.

Otherwise, one continues to the interrogation 81 in which a check is carried out to see whether an identifier "ZoneStatus" in the current zone is set to "ignore" (I). During the execution of "COMPR_Y", the identifier "ZoneStatus" is set to "ignore" (I) for the zones in the intermediate buffer that comprise no change in Y-direction compared to the preceding lines and that are covered with the compression in Y-direction. These are the zones that are left empty in FIG. 6b, for which, thus, no delta commands are generated. They can therefore be ignored in the subsequent superimposition-free compression of the objects in the line. When the identifier "ZoneStatus" is equal to "ignore" (I), the zone counter "Zone" is incremented by one in step 85 and a branch is made back to the interrogation 79.

When "ZoneStatus" is not set to "ignore" (I), the delta command LHD_ZONE is generated in step 82 and stored in the delta list, this delta command identifying the beginning of a zone and the number of following lines over which the content of the zone repeats also being encoded therein. Subsequently, the objects of the zone entered in the intermediate buffer are compressed overlap-free in X-direction in step 83, this being combined under "COMPR_X" and being explained in detail later. Finally, the appropriate delta commands are generated in step 84 for what are now the overlap-free objects of the line and are stored in the delta list. This also includes the comparison of the currently valid "Screening" to the parameter "Screen" in the "ObjectData" and the output of a new delta command "LHD_SCREEN" when required.

Figure 20:
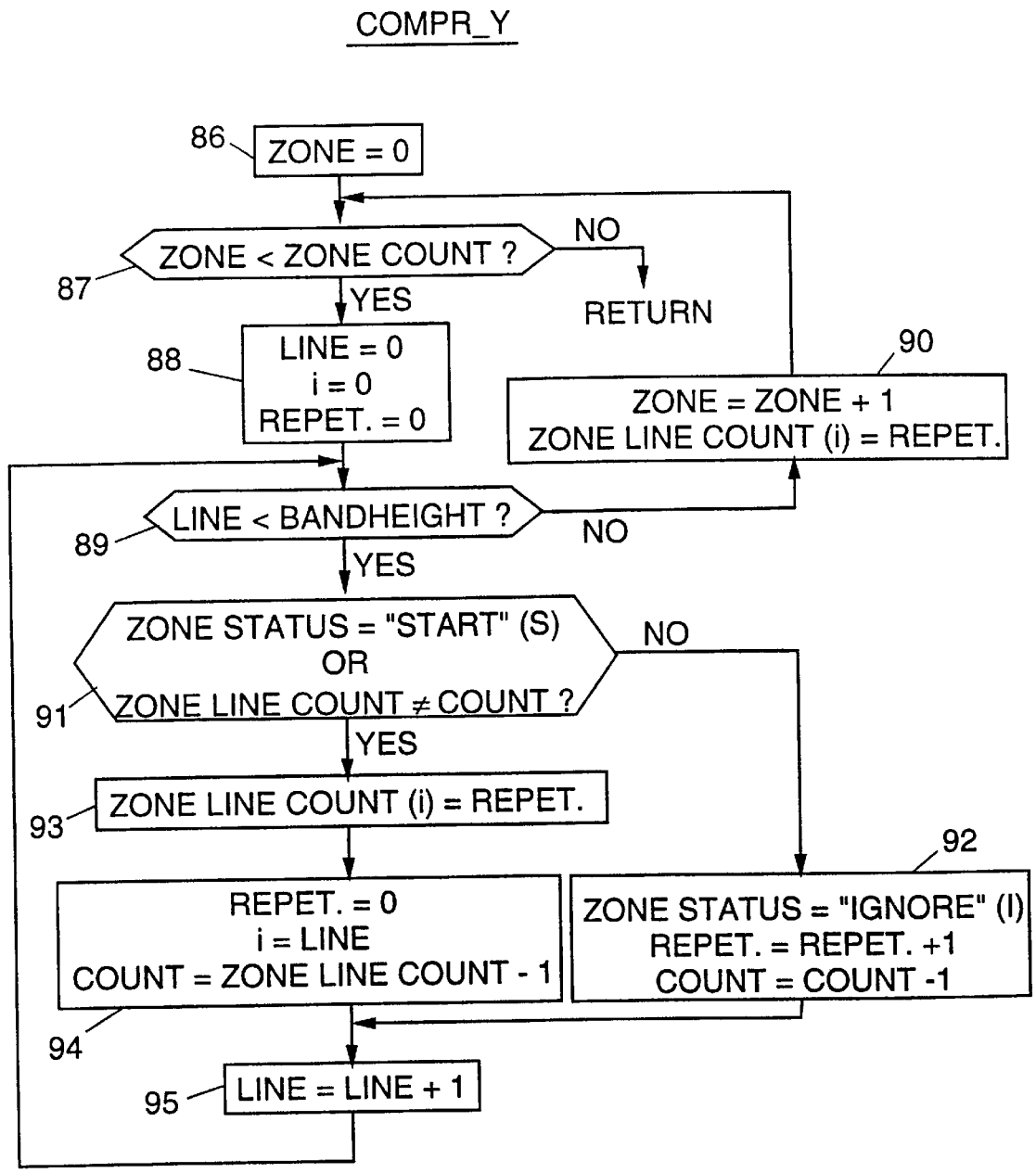
FIG. 20 is a flowchart for the compression in Y-direction.

FIG. 20 shows the method steps combined under "COMPR_Y" with which the zones in the intermediate buffer that have not changed in Y-direction compared to the corresponding zone in the preceding line are found and identified. The processing thereby ensues progressively zone-by-zone from left to right and line-by-line from top to bottom in each zone.

In step 86, a zone counter "Zone" is set to zero, and a check is carried out in the interrogation to see whether the zone counter is still within the band. If no, the processing is ended; if yes, a line counter "Line" that counts off the lines within the zone is set to zero in step 88. A second line counter "i" and a repetition counter "Repet" are likewise set to zero. The repetition counter "Repet" counts how often a zone repeats in the succeeding lines, and the line counter "i" respectively marks the row in the intermediate buffer in which the number of repetitions should be entered. This is the respectively first line of an identified sequence of repetitions.

A check is carried out in the interrogation 89 to see if the current line is still within the band height. If no, the zone counter "Zone" is incremented by one in step 90, and the number of repetitions found is entered in the "ZoneLineCount" in area III of the intermediate buffer in the initial line "i" of the most recently identified sequence of repetitions. The processing then branches back to the interrogation 87.

When the current line still lies in the band height, a check is carried out in the interrogation 91 to see whether the identifier "Start" S is entered in area II of the intermediate buffer or whether the "ZoneLineCount" encountered in area III does not agree with a count variable "Count" that is deincremented synchronized with the encountered "ZoneLineCount" (in step 92). The identifier "Start" S identifies the beginning of a new object, i.e. the corresponding line can therefore not be a repetition of the preceding line. The non-coincidence of "ZoneLineCount" and "Count" identifies an interruption of the repetitions in Y-direction. Both conditions therefore identify data wherein a sequence of repetitions has ended and a new sequence possibly begins.

Figure 21:
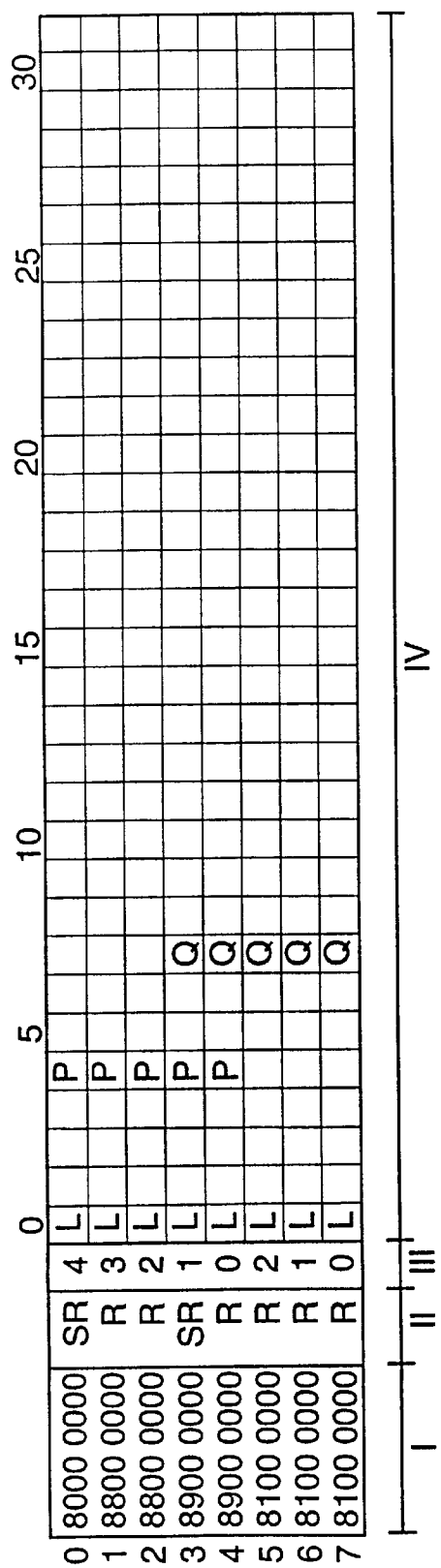
FIG. 21 shows an example of the compression in Y-direction.

This is shown again in a simple example in FIG. 21. An object P extends over the lines 0 through 4. When entering the object in the intermediate buffer, the "ZoneStatus" "Start" (S) was therefore set in row 0 of area II and the "ZoneLineCount" 4 to 0 was entered in the rows 0 through 4 of the area III. A second object Q extends over the lines 3 to 7. The "ZoneStatus" (S) "Start" (S) was therefore set in row 3. The "ZoneLineCount" in rows 3 to 7 would likewise have to run from 4 to 0 for this object if a "ZoneLineCount" for the object P has not already been entered in rows 3 and 4. Since the "ZoneLineCount" entered for the object P is lower than the values valid for the object Q, the "ZoneLineCount" in rows 3 and 4 is not overwritten and is only entered in rows 5 to 7. This was already explained in conjunction with the processing step 59 in FIG. 17. The lines in which a modification of the objects occurs compared to the preceding line are the lines 0 and 3 in the example of FIG. 21 wherein a new object respectively begins and that are identified by the "ZoneStatus" "Start" (S), and line 5 in which the object P drops out. The latter modification is recognized on the basis of the comparison of "ZoneLineCount" and "Count" in the interrogation 91 in FIG. 20.

When the interrogation (91) yields that no change has occurred in the current line compared to the preceding line, the "ZoneStatus" "ignore" (I) is entered in area II of the intermediate buffer, the repetition counter "Repet" is incremented by one and the "Count" is deincremented by one. Subsequently, in step 95, the line counter "Line" is incremented by one and a branch is made back to the interrogation (89).

When a change compared to the preceding line is found in the interrogation 91, the number of identified repetitions is entered in the "ZoneLineCount" of the line "i" in step 93. The line counter "i" always points to the line in which the current sequence of repetitions had begun. In step (94), the next (possible) sequence of repetitions is prepared in that the repetition counter "Repet" is set to zero, the line counter "i" is set to the current line number and the comparison variable "Count" is set to one less than the "ZoneLineCount".

After running through the processing steps "COMPR_Y", all lines that are repetition lines are identified with "ignore" (I), and the number of repetitions is entered in the "ZoneLineCount" of the lines in which a repetition sequence respectively begins.

Figure 22:
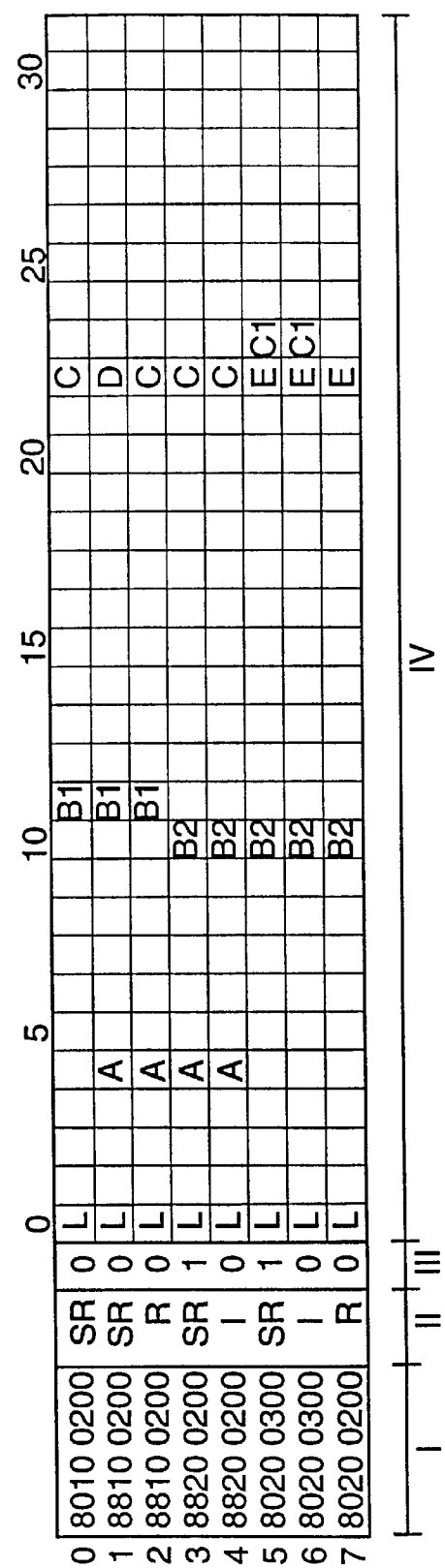
FIG. 22 shows the result of the compression in Y-direction.

FIG. 22 shows the result of this processing phase for the example of FIG. 12. Lines 3 and 4 on the one hand and 5 and 6 on the other hand respectively form a repetition sequence with respectively one repetition. The "ZoneLineCount" of the lines 3 and 5 therefore contains the value "1" and the lines 4 and 5 are identified with "ignore" (I).

Figure 19:
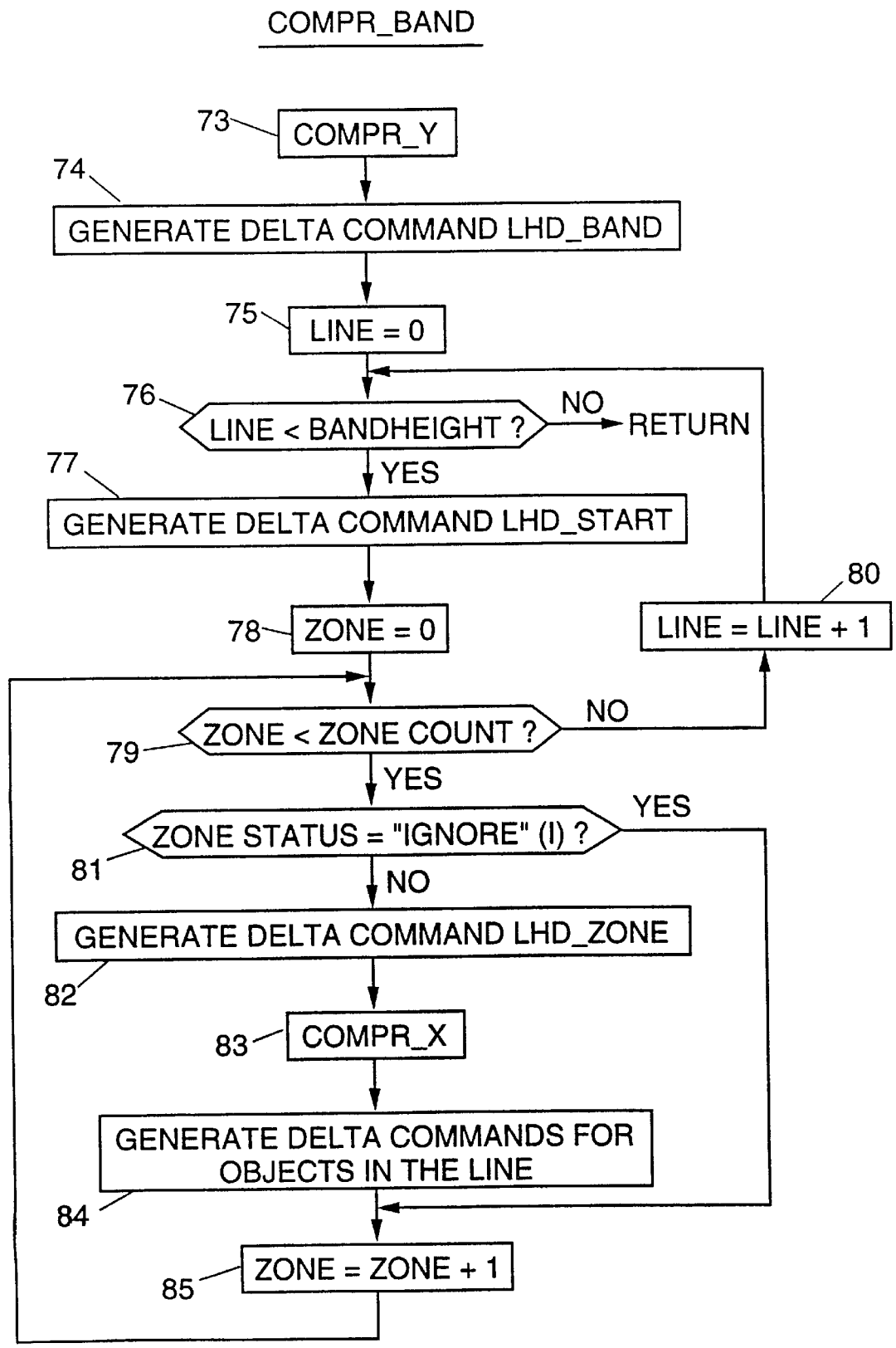
FIG. 19 is a flowchart for the compression of the object in the intermediate buffer and for generating the delta commands.
Figure 23:
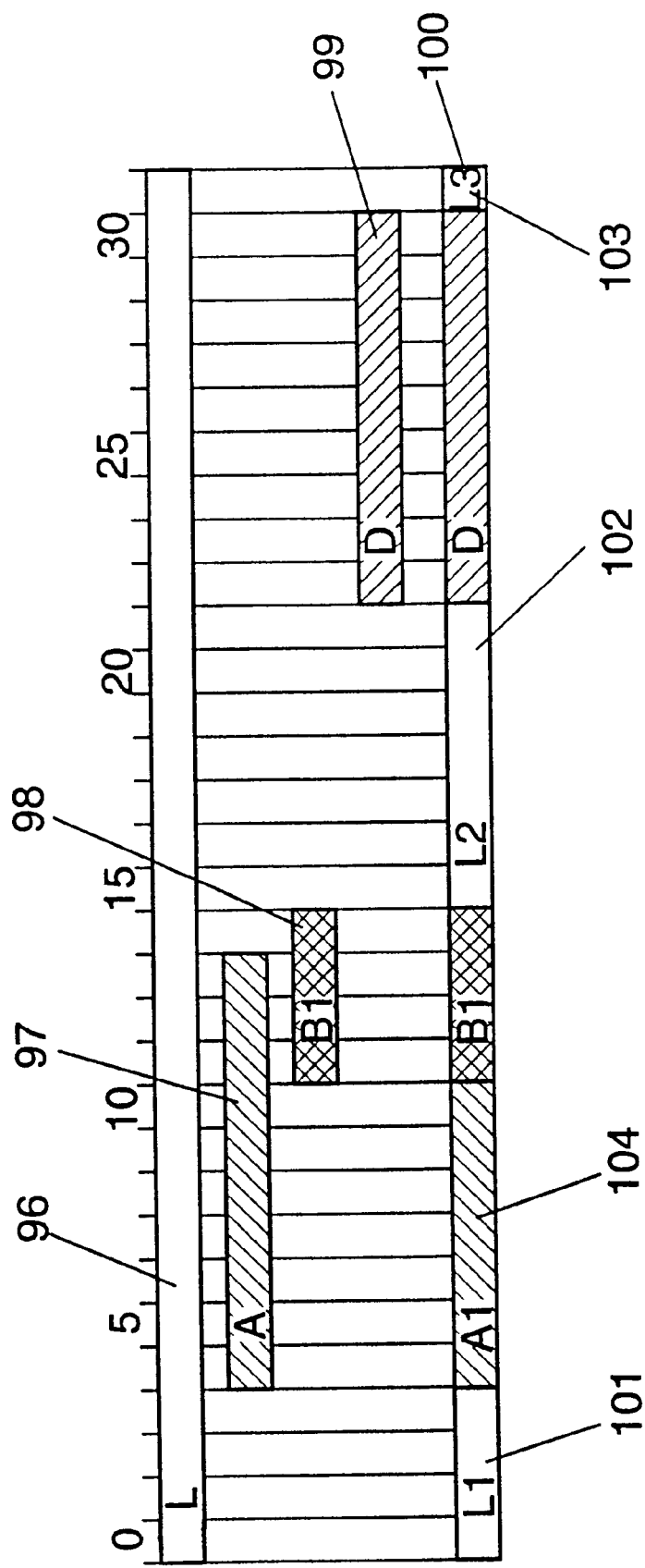
FIG. 23 shows an example of the compression in X-direction.

FIG. 23 shows the superimposition-free compression of the lines in the intermediate buffer, which was combined in FIG. 19 under "COMPR_X", with reference to the example of line 1 from FIG. 22. The objects L (96), A 9(7), B1 (98) and D (99) that superimpose in the line are shown under one another for the sake of clarity. The processing steps "COMPR_X" go through the line from left to right, determine which object covers which other objects, whether an object covers others completely or only partially, and, finally, generate a resultant line (100) that is occupied with objects gap-free and overlap-free. For example, the original object L (96) is divided into three new objects L1 (101), L2 (102), L3 (103) that fill the gaps between the other objets. The object A is shortened to form the new object A1 (104) that extends up to the beginning of the object B1.

Figure 24:
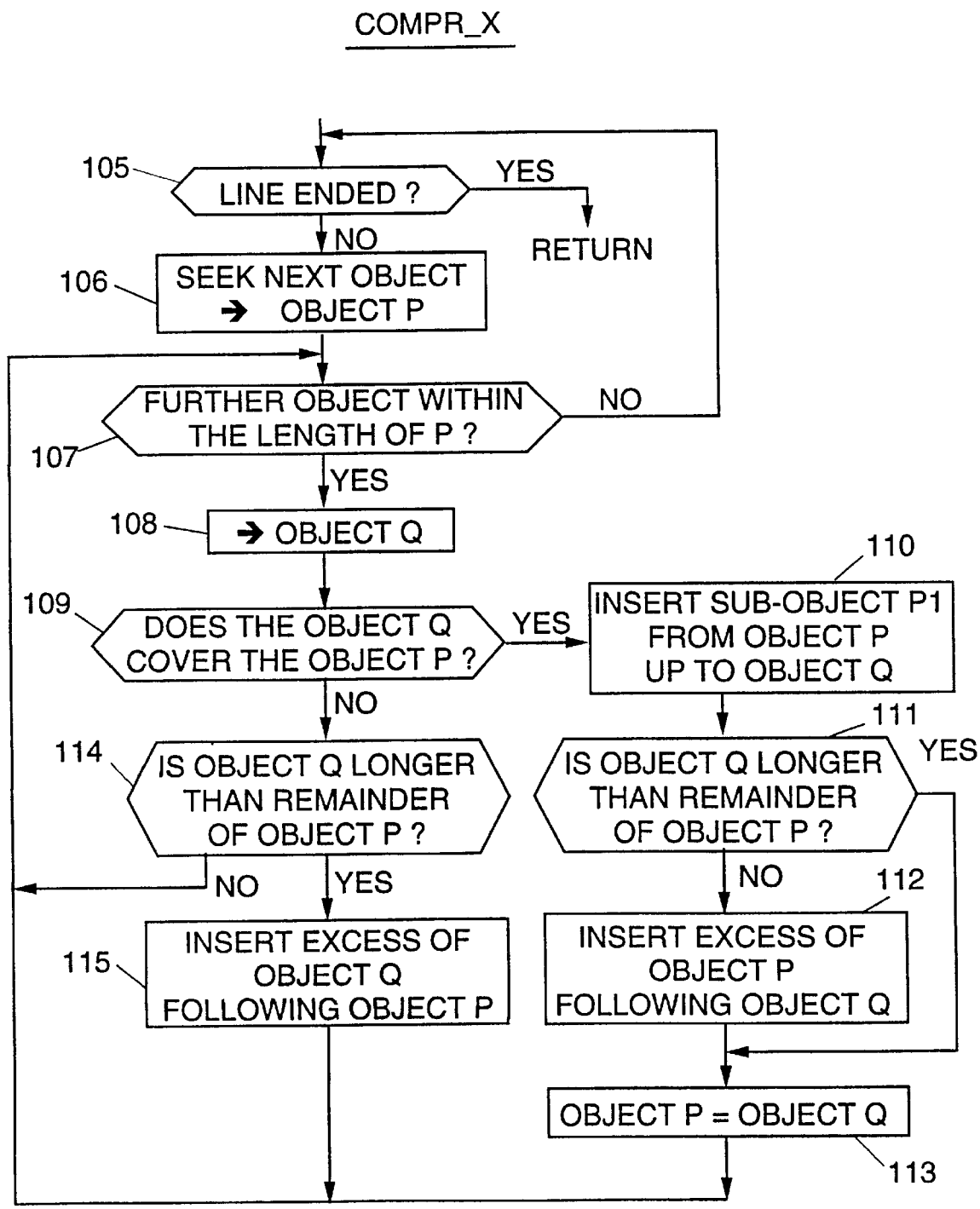
FIG. 24 is a flowchart for the compression in X-direction.

FIG. 24 shows the steps "COMPR_X" again as a flowchart. A check is carried out in the interrogation (105) to see whether the end of the line has been reached. If yes, the processing is ended; otherwise, in step (106), the next object in the line is sought. It is given the temporary designation "Object P". A determination can be made on the basis of its "ObjectNo." and "Length" as to whether it covers other objects and to what extent. A check is made in the interrogation 107 to see whether there is also a further object within the length of P. If yes, it is given the temporary designation "Object Q" in step (108). If no, a further check is carried out to se if the line is ended (105) and the next object is sought (106).

In the interrogation 109, a determination as to which object covers the other is made on the basis of the "ObjectNo." of P and Q. When object Q covers object P, a sub-object P1 with the parameters of P is formed in step 110, but the length thereof extends only from the start of P up to the start of Q. The object L1 (101) and A1 (104) are such sub-objects in the example of FIG. 23. Subsequently, a check is carried out in the interrogation 111 to see whether the object Q is longer that the remainder of P. If yes, Q becomes the new object P and a further object is sought 107. If no, the projecting part of the object P is inserted (112) following the object Q. When the interrogation (109) has the alternative result, the interrogation (114) and the step (115) are implemented analogous to the (111) and 112.

The following table contains excerpts of the delta list that derives after running all processing steps for the objects in FIG. 3. The following notations for the delta commands are thereby employed because of improved readability:

LHD__ZONE (y,b) for the command LHD__ZONE with the parameters y=Y-cmpr and b=bits, LHD__REPEATS (l,g) for the command LHD__REPEATS with the parameters l=run length and g=gray scale value, LHD__SCREEN (i) for the command LHD__SCREEN with the parameter i=number of the screening method.

Generated delta list for the objects in FIG. 3:

|  |  |
|---|---|
|  | LHD-HEADER (..........) |
|  | LHD-BAND |
| Line 0: | LHD-START |
|  | LHD-ZONE (0,8) |
|  | LHD-SCREEN (1) |
|  | LHD-REPEATS (11,255) |
|  | LHD-REPEATS (4,4) |
|  | LHD-REPEATS (7,255) |
|  | LHD-REPEATS (7,162) |
|  | LHD-REPEATS (3,255) |
| Line 1: | LHD-START |
|  | LHD-ZONE (0,8) |
|  | LHD-REPEATS (4,255) |
|  | LHD-REPEATS (7,128) |
|  | LHD-REPEATS (4,4) |
|  | LHD-REPEATS (7,255) |
|  | LHD-SCREEN (2) |
|  | LHD-REPEATS (9,51) |
|  | LHD-SCREEN (1) |
|  | LHD-REPEATS (1,255) |
| Lines 3 and 4: | LHD-START |
|  | LHD-ZONE (1,8) |
|  | LHD-REPEATS (4,255) |
|  | LHD-REPEATS (6,128) |
|  | LHD-REPEATS (7,4) |
|  | LHD-REPEATS (5,255) |
|  | LHD-REPEATS (7,162) |
|  | LHD-REPEATS (3,255) |

The sum of the run lengths in each line of the zone respectively yields the zone width of 32 pixels. The parameter y=1 in the command LHD__ZONE (y,b) in the delta commands for lines 3 and 4 indicates that the following run length commands LHD__REPEATS (l,g) are valid in the same way for both lines.

Although various minor changes and modifications might be proposed by those skilled in the art, it will be understood that our wish is to include within the claims of the patent warranted hereon all such changes and modifications as reasonably come within our contribution to the art.

I claim as my invention:

1. A method for generating a data format for describing a reproducible printer page for recording, comprising the steps of:

processing a programmed page description of a content of the printer page composed of text, graphics and image information by an interpreter, and generating a list of graphic objects for said information;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements; and generating commands and code words for subsets of the picture elements to form a data format which describes the printer page as a contone map.

2. The method according to claim 1 wherein the contone map is organized line-by-line and pixel-by-pixel.

3. The method according to claim 1 wherein the contone map is data-compressed by reducing a number of bits per gray scale value.

4. The method according to claim 1 wherein the contone map is data-compressed by difference coding between gray scale values of neighboring picture elements.

5. The method according to claim 1 wherein the object parameters and additional parameters for the simpler objects are stored in an intermediate buffer.

6. The method according to claim 5 wherein the simpler objects are made free of overlap based on the parameters in the intermediate buffer.

7. The method according to claim 5 wherein the simpler objects are compressed based on the parameters in the intermediate buffer.

8. The method according to claim 1 wherein a plurality of contone maps are generated for a printer page.

9. The method according to claim 1 wherein the contone map is converted into a screened bit map representation for output.

10. The method according to claim 1 wherein the contone map contains commands and parameters for control of its further processing.

11. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and data-compressing the contone map according to a run length coding method in a first direction.

12. The method according to claim 11 wherein the contone map is data-compressed according to a run length coding method in a second direction that is perpendicular to the first direction.

13. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and subdividing the contone map into horizontal strip-shaped bands.

14. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and subdividing the contone map into vertical strip-shaped zones.

15. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and the contone map describing a signature according to an imposing method, said signature combining a plurality of pages, register marks, fold marks, cut marks, and print control fields.

16. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and a plurality of contone maps being generated for a signature.

17. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and the contone map being utilized for recording of printer's copies, printing forms and prints for various output processes, including at least one of the processes selected from the group consisting of film exposure, printing plate exposure, proof exposure, picture screen presentation, rotogravure, and digital printing.

18. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and the contone map being recorded without a start/stop mode of an output device.

19. A method for generating a data format for describing a reproducible printer page for recording, comprising the steps of:

processing a programmed page description of a content of the printer page composed of text, graphics and image information by an interpreter, and generating a list of graphic objects;

describing the graphic objects by a set of object parameters, including starting position, length, height, and gray scale value;

subdividing the objects into simpler objects;

analyzing object parameters of the simpler objects with respect to superimposition of simpler objects;

modifying the object parameters of the simpler objects to make them free of superimposition;

assigning picture elements to the superimposition-free simpler objects;

assigning gray scale values to the picture elements;

generating commands and code words for subsets of the picture elements to form a data format which describes the printer page as a contone map; and the contone map being generated in a resolution that is independent of a resolution of an output device.

* * * * *